United States Patent
Saunders et al.

(10) Patent No.: US 8,118,887 B2
(45) Date of Patent: *Feb. 21, 2012

(54) PACKAGED CHARCOAL BRIQUET PRODUCT

(75) Inventors: Craig Saunders, Rocky River, OH (US); James F. Meskill, Cleveland, OH (US)

(73) Assignee: Creative Sparks, LLC, Cleveland, OH (US)

(*) Notice: Subject to any disclaimer, the term of this patent is extended or adjusted under 35 U.S.C. 154(b) by 927 days.

This patent is subject to a terminal disclaimer.

(21) Appl. No.: 11/651,056

(22) Filed: Jan. 8, 2007

(65) Prior Publication Data

US 2007/0107299 A1    May 17, 2007

Related U.S. Application Data

(63) Continuation-in-part of application No. 11/054,242, filed on Feb. 9, 2005, now Pat. No. 7,575,609, which is a continuation-in-part of application No. 10/858,224, filed on Jun. 1, 2004, which is a continuation-in-part of application No. 10/172,549, filed on Aug. 7, 2002, now Pat. No. 6,790,244.

(51) Int. Cl.
*C10L 5/00* (2006.01)
*C10L 11/00* (2006.01)

(52) U.S. Cl. ............... 44/531; 44/532; 44/533; 44/534; 44/541; 44/550

(58) Field of Classification Search .......... 44/531, 44/532, 533, 534, 541, 550
See application file for complete search history.

(56) References Cited

U.S. PATENT DOCUMENTS

| | | | |
|---|---|---|---|
| 236,889 | A | 1/1881 | Hammer et al. |
| D24,313 | S | 5/1895 | Taggert |
| D27,483 | S | 8/1897 | Zwoyer |
| D27,484 | S | 8/1897 | Zwoyer |
| D33,520 | S | 11/1900 | Davis |
| D34,677 | S | 6/1901 | Rockwell |
| 737,023 | A | 8/1903 | Rockwell |
| D38,206 | S | 8/1906 | Allen |
| 978,182 | A | 12/1910 | McCan |

(Continued)

FOREIGN PATENT DOCUMENTS

EP    0276697    1/1988

(Continued)

OTHER PUBLICATIONS

2001 No. 433 CLEAR AIR "The Smoke Control Areas (Authorised Fuels) (Scotland) Regulations 2001" 1993 c. 11; section 63(1) was amended by the Environment Act 1995 (c. 25), Schedule 22, paragraph 199, St. Andrew's House, Edinburgh, Nov. 22, 2001 by Rhona Brankin (Scottish Ministers), 10 pages.

(Continued)

*Primary Examiner* — Cephia D Toomer
(74) *Attorney, Agent, or Firm* — Gazdzinski & Associates, PC

(57) ABSTRACT

An improved charcoal briquet having combustion aiding surfaces is packaged in a compact boxed package. A charcoal briquet having improved burning characteristics and also improved shipping and retailing characteristics is thereby provided. An improved packaged charcoal product including a flat sided box adapted to hold randomly oriented briquets and be split open at its corners and at a lower portion for use in igniting the briquets and a grooved pillow shaped briquet are also disclosed.

26 Claims, 25 Drawing Sheets

U.S. PATENT DOCUMENTS

| | | | | |
|---|---|---|---|---|
| 1,194,613 | A | 8/1916 | Fredikson | |
| 1,780,205 | A | 11/1930 | Maurel | |
| 1,866,931 | A | 7/1932 | Heffernan | |
| D88,351 | S | 11/1932 | Herrly | |
| 1,959,472 | A | 5/1934 | Heffernan, Jr. | |
| 1,959,473 | A | 5/1934 | Heron | |
| 2,212,157 | A | 8/1940 | Fernholtz | |
| 2,240,335 | A * | 4/1941 | Keil | 44/541 |
| 2,738,260 | A | 3/1956 | Wolfson et al. | |
| 2,933,378 | A | 4/1960 | Mustin et al. | |
| 3,010,809 | A | 11/1961 | Peck | |
| 3,028,228 | A | 4/1962 | Chaplin | |
| 3,031,277 | A | 4/1962 | Strauss | |
| 3,056,665 | A * | 10/1962 | Linda et al. | 431/35 |
| 3,297,420 | A | 1/1967 | Klink et al. | |
| 3,336,122 | A | 8/1967 | Smith | |
| 3,352,651 | A | 11/1967 | Davidson | |
| 3,370,582 | A | 2/1968 | Rauh | |
| 3,374,071 | A | 3/1968 | Corriher, Jr. et al. | |
| 3,395,002 | A | 7/1968 | Winnicki et al. | |
| 3,431,093 | A | 3/1969 | Kreunik | |
| 3,485,599 | A | 12/1969 | Richardson et al. | |
| 3,527,580 | A | 9/1970 | Bonlie | |
| 3,650,711 | A | 3/1972 | Unick et al. | |
| 3,866,748 | A | 2/1975 | Manning, Jr. | |
| 3,877,886 | A | 4/1975 | Daizell | |
| D236,889 | S | 9/1975 | Sargis | |
| 3,902,705 | A | 9/1975 | Easwaran | |
| 3,927,993 | A | 12/1975 | Griffin | |
| 3,934,986 | A | 1/1976 | Avedikian | |
| 3,950,143 | A | 4/1976 | Pyle | |
| 3,955,937 | A | 5/1976 | Whang | |
| 3,988,121 | A | 10/1976 | Leveskis | |
| 4,058,052 | A | 11/1977 | Hart | |
| 4,101,292 | A | 7/1978 | Hogan, II | |
| 4,118,202 | A | 10/1978 | Scholes | |
| 4,165,968 | A | 8/1979 | Duncan | |
| 4,167,398 | A | 9/1979 | Hughes et al. | |
| 4,175,925 | A | 11/1979 | Paek et al. | |
| 4,243,393 | A | 1/1981 | Christian | |
| 4,243,394 | A | 1/1981 | Kincaid | |
| D258,386 | S | 2/1981 | Juett | |
| D272,758 | S | 2/1984 | Koziol | |
| D272,759 | S | 2/1984 | Koziol | |
| D272,760 | S | 2/1984 | Koziol | |
| D272,761 | S | 2/1984 | Koziol | |
| D272,847 | S | 2/1984 | Koziol | |
| D272,848 | S | 2/1984 | Koziol | |
| 4,437,862 | A | 3/1984 | Whang | |
| 4,442,681 | A | 4/1984 | Fischer | |
| 4,443,227 | A | 4/1984 | Avedikian | |
| 4,460,377 | A | 7/1984 | Kalil | |
| D275,224 | S | 8/1984 | Darche | |
| 4,478,601 | A | 10/1984 | Stephens | |
| 4,485,584 | A | 12/1984 | Raulerson | |
| 4,496,366 | A * | 1/1985 | Peters | 44/530 |
| D298,027 | S | 10/1988 | Stephenson | |
| 4,775,391 | A | 10/1988 | Antosko | |
| 4,786,290 | A | 11/1988 | Wyer | |
| 4,793,320 | A | 12/1988 | Bakic | |
| 4,810,256 | A | 3/1989 | Fay, III et al. | |
| 4,822,380 | A | 4/1989 | Young | |
| 4,832,703 | A | 5/1989 | Campana et al. | |
| 4,834,774 | A | 5/1989 | Fay, III | |
| D304,574 | S | 11/1989 | Fay | |
| D305,752 | S | 1/1990 | Chow | |
| 4,899,721 | A | 2/1990 | Tsay | |
| 4,981,496 | A | 1/1991 | Hausslein | |
| 5,038,573 | A | 8/1991 | McAllister | |
| 5,143,045 | A | 9/1992 | Minnis | |
| D330,362 | S | 10/1992 | Harris | |
| 5,186,721 | A | 2/1993 | Campana | |
| 5,252,107 | A | 10/1993 | Wilkins, Jr. | |
| 5,273,555 | A | 12/1993 | DeCarlo | |
| 5,290,326 | A | 3/1994 | Campana | |
| 5,427,805 | A | 6/1995 | Crace | |
| 5,468,266 | A | 11/1995 | Bensalem et al. | |
| 5,469,835 | A | 11/1995 | Stephen et al. | |
| D389,453 | S | 1/1998 | Mitchell | |
| 5,762,656 | A | 6/1998 | Burke | |
| 5,830,245 | A | 11/1998 | Raddon | |
| D406,635 | S | 3/1999 | Russell et al. | |
| 5,893,946 | A | 4/1999 | Landis | |
| 5,912,192 | A | 6/1999 | Kim | |
| 5,958,090 | A | 9/1999 | Chandaria | |
| 6,074,446 | A | 6/2000 | Fujino | |
| 6,080,214 | A | 6/2000 | Mungia | |
| 6,136,053 | A | 10/2000 | Sullivan | |
| 6,224,643 | B1 | 5/2001 | Mungia | |
| 6,328,028 | B1 | 12/2001 | Cayse et al. | |
| 6,345,802 | B2 | 2/2002 | Moore | |
| 6,357,653 | B1 | 3/2002 | Murcia | |
| 6,790,244 | B2 | 9/2004 | Saunders | |
| D517,005 | S | 3/2006 | Melin | |
| D517,473 | S | 3/2006 | Jackson | |
| D519,917 | S | 5/2006 | Melin | |
| 7,575,609 | B2 * | 8/2009 | Saunders et al. | 44/530 |
| 2002/0020108 | A1 | 2/2002 | Anderson | |
| 2002/0073612 | A1 | 6/2002 | Motai et al. | |
| 2002/0189159 | A1 | 12/2002 | Sprules et al. | |
| 2003/0080456 | A1 | 5/2003 | Tai et al. | |
| 2003/0089028 | A1 | 5/2003 | Jordan | |
| 2004/0222117 | A1 | 11/2004 | Saunders et al. | |
| 2005/0178052 | A1 | 8/2005 | Saunders et al. | |
| 2005/0246946 | A1 | 11/2005 | Paplinski | |
| 2006/0064926 | A1 | 3/2006 | Melin | |
| 2006/0137244 | A1 | 6/2006 | Melin et al. | |

FOREIGN PATENT DOCUMENTS

| | | |
|---|---|---|
| JP | 57087539 | 6/1982 |
| JP | 358162696 A | 9/1993 |
| JP | 2001-254088 | 9/2001 |

OTHER PUBLICATIONS

"Improved Pillow-Shaped Stackable Charcoal Briquets," 11 pages plus 1 sheet of drawings.

Proof of Markings for Briquet Bag configured to contain briquets including 3 page of drawings and text, Published in Jun. 1990 as part of a test market. Members of the public in California were given bags marked as shown on the attached exhibits to the declaration of Mylene Caplan. The bags contained grooved briquets. The members of the public showing interest in the briquets were asked to use the briquets and then were called back and asked their opinion of the briquet's performance.

Sohut-Conreur brochure was published at least as early as May 2000. Page 6 identifies that charcoal is a field of application of the briquetting equipment and p. 7 shows a picture of a black grooved briquette. The declaration of Don Swatting indicates that this brochure was acquired in New Brunswick, New Jersey, at a course titled "Briquetting, Pelletizing, Extrusion and Fluid bed/Spray Granulation" attended at the Center for Professional Advancement on May 1-4, 2000.

Eric W. Weisstein, "Random Close Packing." From Math-World—A Wolfman Web Resource. http://mathworld.wolfram.com/RandomClosePacking.html.

"Sweet science: Common candies yiled physics discovery," Princeton University Press Release, Feb. 12, 2004.

\* cited by examiner

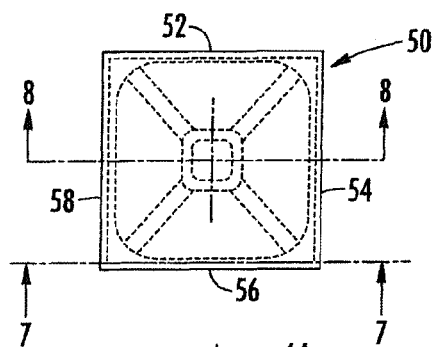
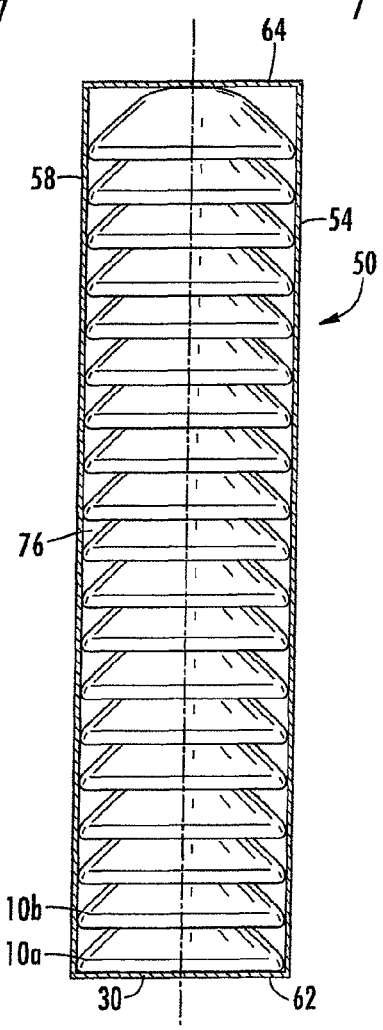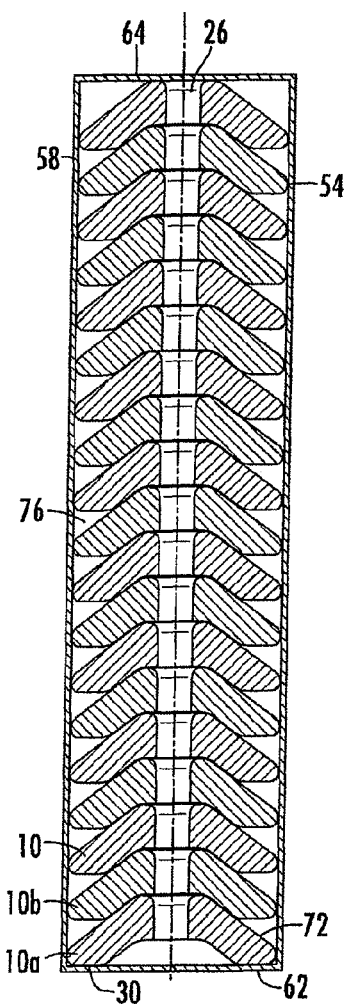
FIG. 6
FIG. 7
FIG. 8

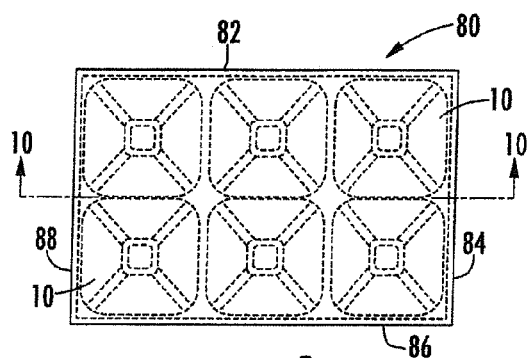
FIG. 9
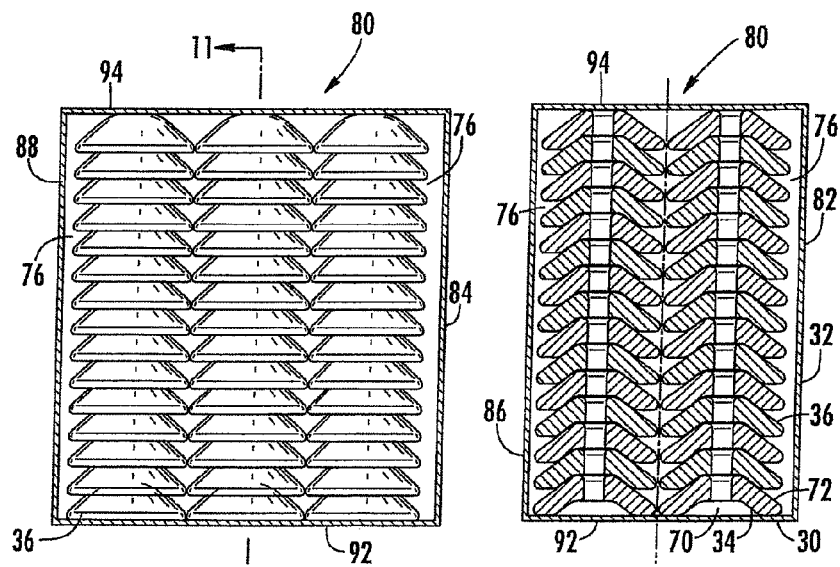
FIG. 10
FIG. 11

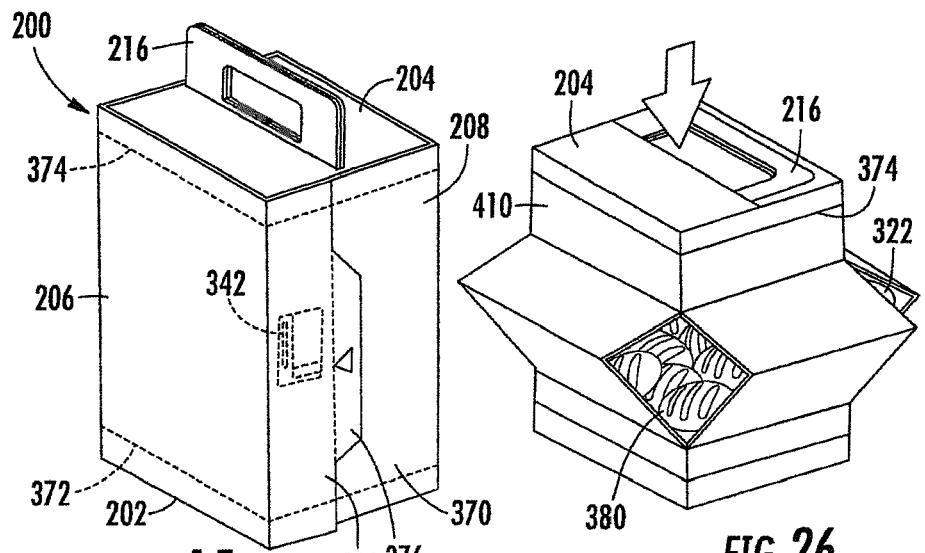
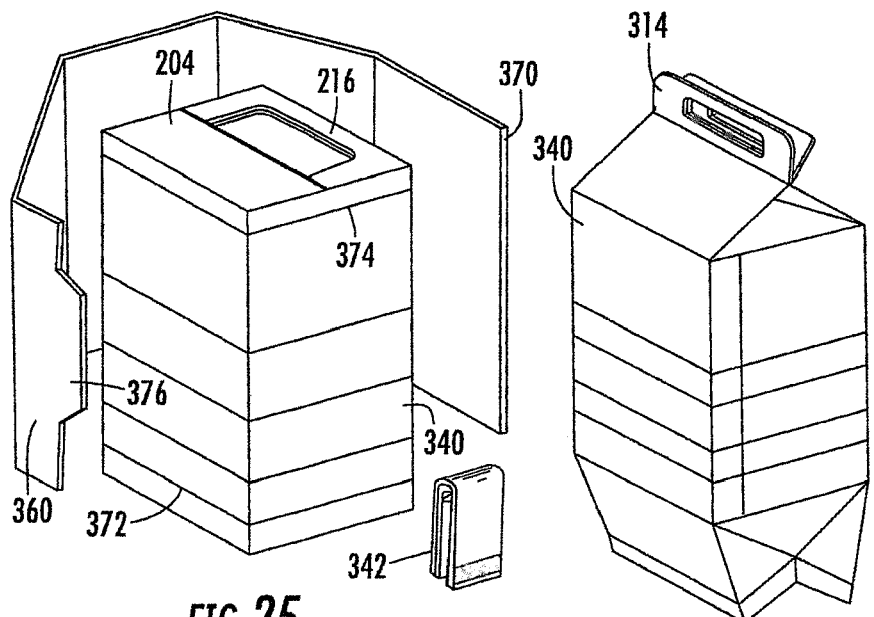

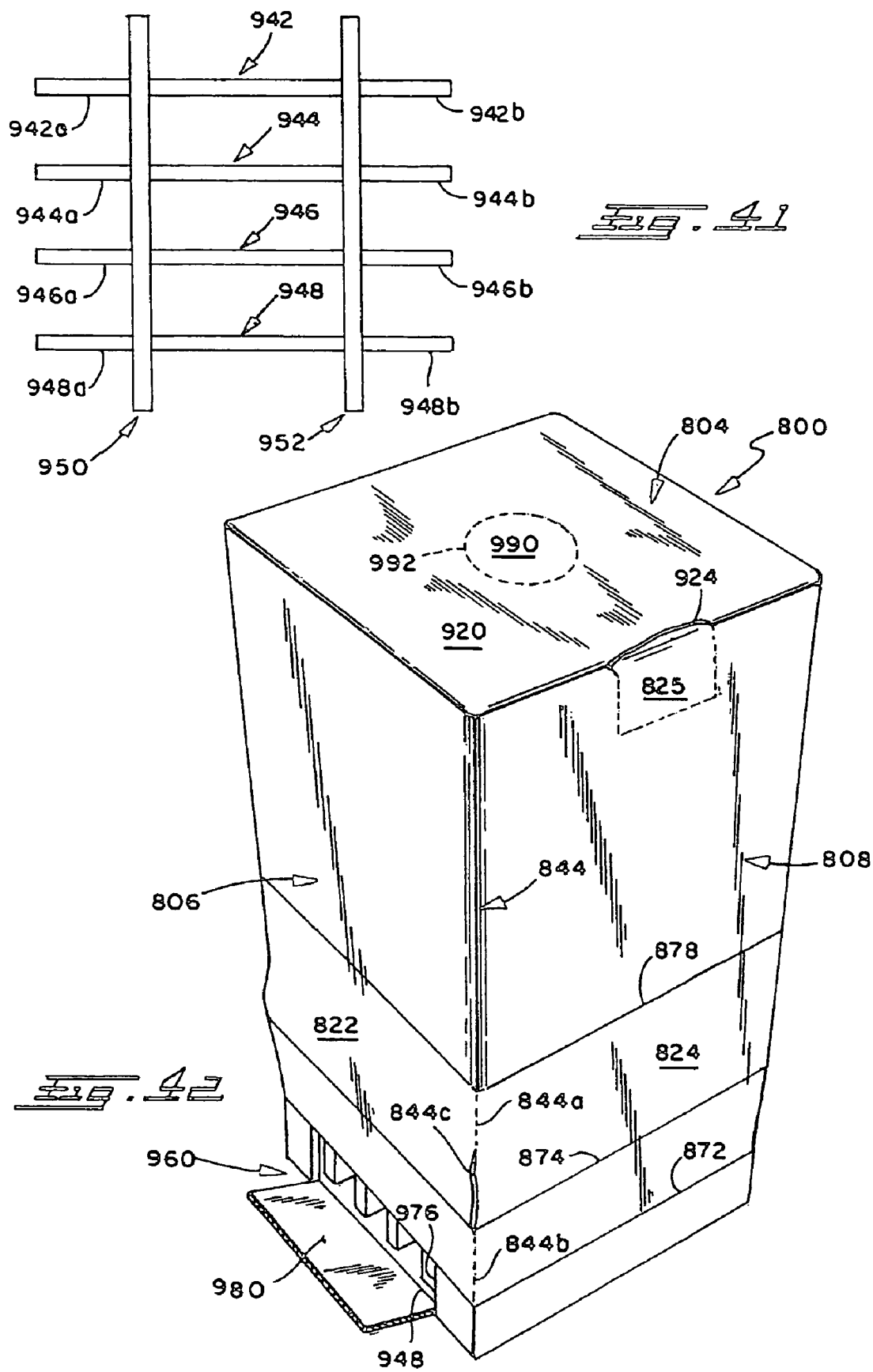

PACKAGED CHARCOAL BRIQUET PRODUCT

The present application is a continuation-in-part of U.S. patent application Ser. No. 11/054,242, filed Feb. 9, 2005, issued on Aug. 18, 2009 as U.S. Pat. No. 7,575,609 which in turn is a continuation-in-part of U.S. patent application Ser. No. 10/858,224, filed Jun. 1, 2004 which in turn is a continuation-in-part of U.S. patent application Ser. No. 10/172,549, filed Aug. 7, 2002, now U.S. Pat. No. 6,790,244.

BACKGROUND

This invention relates to the field of charcoal briquets for use in home barbequing and the like, and particularly to an improved shape for the briquet, package for the briquet, and method of burning the briquets in home barbequing.

Charcoal briquets are widely used by consumers in cooking and barbequing in outdoor grills, grates, and other locations. Conventional charcoal briquets are pillow-shaped and sold in multi-pound paper bag containers. The briquets are contained somewhat loosely in the paper bag container. Because of the random loose pack, abrasion between adjacent briquets in the bag is common, creating dust which often leaks out of the bag. Thus, a dusty, messy environment is created in shipping and retailing these packages. Additionally, the bags themselves are not a convenient shape for stacking or palletizing. This makes the products difficult to handle in shipping and also in retailing. The bags often weigh 5, 8, 10, 15, and 20 pounds. Because of their shape and charcoal dusty condition, they are inconvenient for consumers to handle when shopping, transporting, or storing.

Charcoal briquets are mainly used to prepare barbequed or grilled food items. One mechanism of use is to pile charcoal briquets in the center of a grill, apply an ignition fluid to the piled briquets, and ignite the ignition fluid. An ignition fluid is required, as conventional charcoal briquets are slow to ignite. The burn time of the ignition fluid ignites the surface of the charcoal briquets in the pile. After a sufficient burn time, the charcoal briquets in the pile are ignited. This becomes apparent to the user when a gray ash layer forms on the surface of the briquets. When the ash layer is observed, the briquets are spread out in the grill bottom and are ready for use in cooking.

Charcoal briquets are conventionally fabricated from base fuels such as charred wood, coal, charred agricultural waste, and similar products. Conventional briquets also use a binder which can be a vegetable starch or other conventional binder material. Some conventional charcoal briquets also include ignition aids which are materials which ignite more quickly than the base fuel and help in ignition of the charcoal briquet. This invention is not concerned with the composition of the charcoal briquet, but rather the shape and packaging of the charcoal briquet that is useable with any charcoal briquet materials and composition. Conventional materials and compositions are well known in the art and described in, for instance, U.S. Pat. No. 5,762,656 to Burke, et al.

While charcoal briquets are widely used for cooking on grills and in barbeque pits, numerous problems exist with this fuel source. Conventional charcoal briquets are often hard to ignite and require the use of an auxiliary ignition fluid. Charcoal briquets are conventionally marketed in large bags which are difficult to handle in shipping, retailing and by the consumer. Such bags are not easily stacked, and cannot be conveniently displayed in an upright position in retail stores. Conventional charcoal briquets are normally packaged in large bags, from which a consumer must pour out the desired amount, measuring informally and often using less or more than is appropriate for the meal to be cooked. The remaining charcoal briquets in the bag must be stored in an open bag, which is messy, and often leaks carbon dust. The burn characteristics of conventional charcoal are also less than ideal with too much time being spent in the ignition phase prior to the cooking phase in which food is actually cooked over the ignited briquets.

SUMMARY

In accordance with the disclosure, an improved charcoal briquet and package for multiple briquets is provided comprising a container fabricated from combustible sheet material comprising a bottom wall, a plurality of side walls and a top. The side walls are interconnected at creased corners. The creased corners have weakened portions. The package further comprises a bag fabricated from combustible sheet material having a quantity of charcoal briquets contained in the bag. The bag and the charcoal briquets are contained in the container. The corner weakened portions are adapted to open when the container is vertically compressed.

Further in accordance with the present disclosure, a charcoal briquet package is provided comprising a first container fabricated from a combustible sheet material and having a quantity of charcoal briquets contained therein. The package further comprises a second container fabricated from a combustible sheet material including a rectangular flat bottom wall, four flat side walls interconnected at four right angular corners. The four side walls are all generally perpendicular to the bottom wall. A ventable flat top is also provided generally parallel to the bottom wall. The four corners have weakened portions. The first container is contained in, the second container. The package further comprises a third container surrounding the second container and includes a selectively removable wrap portion surrounding the corner weakened portions. The weakened corner portions are adapted to split open when the wrap portion is removed and the second container is vertically compressed.

Still further in accordance with the disclosure, a charcoal briquet package product is provided comprising: a first container fabricated from a combustible sheet material and having a quantity of charcoal briquets contained therein. The package further comprises a second container fabricated from combustible sheet material including a continuous bottom wall, a plurality of side walls interconnected at creased corners. The creased corners have weakened portions. The package still further comprises a third container surrounding at least a portion of the second container including a selectively removable wrap portion surrounding the corner weakened portions. The weakened corner portions are adapted to spit open when the wrap portion is removed and the second container is vertically compressed.

BRIEF DESCRIPTION OF THE DRAWINGS

The invention may take physical form in certain parts and arrangements of parts, a preferred embodiment of which will be described in detail and which is illustrated in the accompanying drawings which form a part hereof and wherein:

FIG. 6 is a top view of a stack of charcoal briquets within a cardboard retailing container with the top removed;

FIG. 7 is a side view of the stack of briquets in the box of FIG. 6 with the closest side wall removed;

FIG. 8 is a cross section of a stack of briquets in the box seen in FIG. 7 taken along line 8-8 of FIG. 7;

FIG. 9 is a top plan view similar to FIG. 6 showing a larger package of briquets using six adjacent vertical stacks;

FIG. 10 is a side view of the package of briquets of FIG. 9 with the side wall of the box closest to the viewer removed;

FIG. 11 is a cross section of the package of briquets seen in FIGS. 9 and 10 taken along line 11-11 in FIG. 10;

FIG. 15 is a perspective view of another embodiment of the packaged charcoal product in the complete packaged configuration with the handle upstanding;

FIG. 20 is a perspective view of the inner container blank of FIG. 16 partially assembled;

FIG. 25 is a view similar to FIG. 15 showing the packaged charcoal briquet product partially opened in preparation for use by the consumer;

FIG. 26 is a view of the packaged charcoal product of FIGS. 15-25 fully opened just prior to ignition by the consumer;

FIG. 41 is a top plan view of the insert;

FIG. 42 is a view similar to FIG. 36 showing the packaged charcoal product partially opened in preparation for use by the consumer;

DETAILED DESCRIPTION

Figure 1:
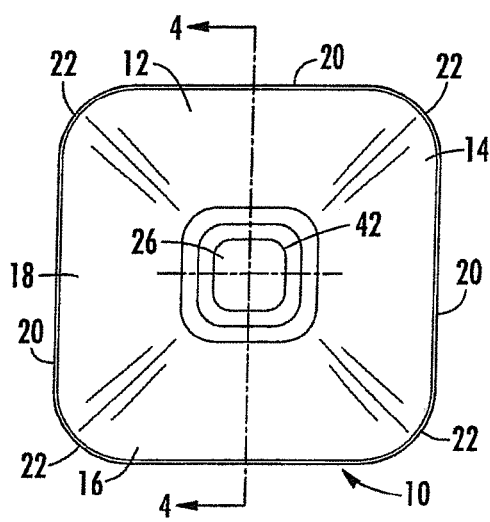
FIG. 1 is a top plan view of a charcoal briquet in accordance with the present invention.

Referring now to the drawings wherein the showings are for the purpose of illustrating embodiments of the invention only and not for the purpose of limiting same, FIG. 1 shows a charcoal briquet 10 in plan view. Charcoal briquet 10 has a generally square periphery with four sides 12, 14, 16, and 18. Each side has an outer peripheral edge 20 which is gently bowed outwardly towards its center, but relatively straight. The four edges 20 are interconnected by corners 22 with a radius of curvature significantly smaller than the radius of curvature of the gently bowed edges 20. A hole 26 is located in the central area of the briquet 10 between the sides 12, 14, 16, 18.

Figure 4:
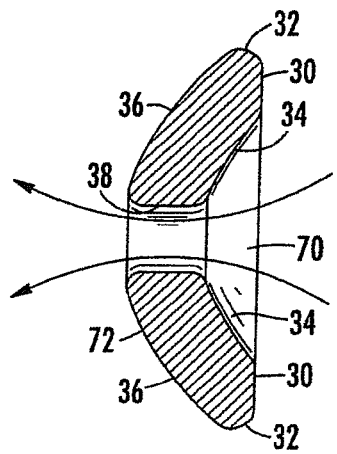
FIG. 4 is a cross-sectional view of the charcoal briquet of FIGS. 1 and 2 taken along line 4-4 of FIG. 1.
Figure 2:
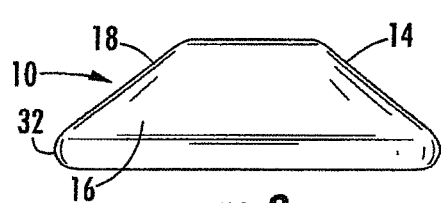
FIG. 2 is a side view of the charcoal briquet of FIG. 1.
Figure 5:
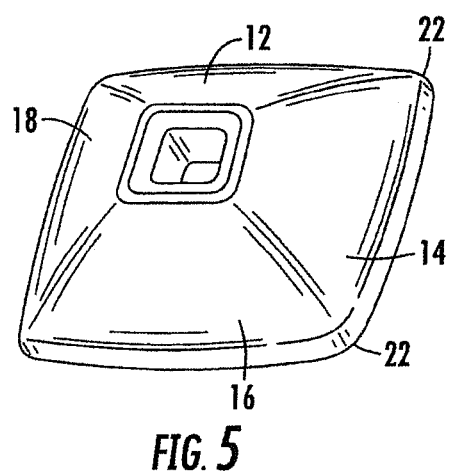
FIG. 5 is a perspective view of the charcoal briquet of FIGS. 1-4.

Referring now to FIG. 4, one sees the charcoal briquet of FIG. 1 in cross section. The charcoal briquet 10 has an upper surface which is generally convex with a hole 26 in the center. The lower surface of the charcoal briquet 10 is generally concave. The briquet back side 12 is bounded by a generally planar horizontal bottom surface 30, a rounded outer peripheral edge 32, an upwardly and inwardly extending lower surface 34, an upwardly and inwardly extending upper surface 36 and a vertically extending inner surface 38 extending between the lower surface 34 and upper surface 36. The lower surface 34 is gently concave but overall extends inwardly and upwardly at an angle of about 30.degree. from the horizontal. The upper surface 36 is gently convex and extends inwardly and upwardly at an angle of about or slightly greater than 30.degree. The lower surface and upper surface are generally parallel to one another. However, a slight divergence away from one another as one moves towards the center of the briquet may be used.

The front side of the briquet 16 is the mirror image of the back side of the briquet 12. That is, the briquet 10 is symmetrical about its central axis as viewed in the cross section shown in FIG. 4. Moreover, if one rotates the briquet by 90.degree., one still sees the cross section seen in FIG. 4. That is, the briquet 10 is symmetrical with respect to the side walls 14 and 18, as well as with respect to the side walls 12 and 16, and all the side walls 12, 14, 16, 18 have identical cross sections at their centers and curve identically towards the corners 22.

Figure 3:
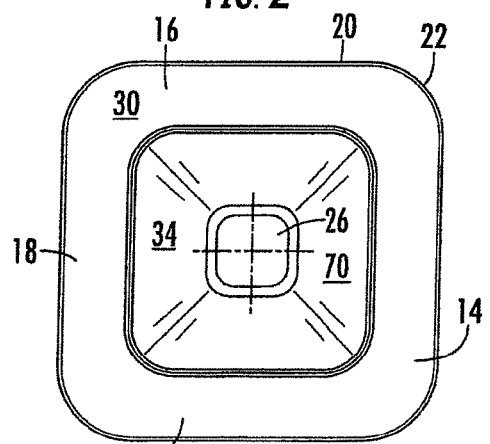
FIG. 3 is a bottom view of the charcoal briquet of FIGS. 1 and 2.

The central portion of the charcoal briquet 10 is occupied by a hole 26 bounded by the vertically extending inner surface 38 of each of the sides 12, 14, 16, 18. As can be seen in FIGS. 1 and 3, the side walls are interconnected by curved hole corners 42. Of course, the hole 26 could have a circular periphery rather than the rounded square periphery illustrated in the figures. Additionally, a briquet having a rectangular outline in the horizontal plane rather than a square outline accomplishes many of the objects of the present invention.

In the preferred embodiment, the briquet is approximately 2.39 inches wide when measured from the center of the outer periphery of one edge to the opposite edge. Thus, the width dimension from the center of the right side 14 to the center of the left side 18 is approximately 2.39 inches. Similarly, the dimension from the center of the front side 16 to the center of the back side 12 is approximately 2.39 inches. The overall height of the briquet from the bottom of the bottom surface 30 to the periphery of the hole 26 is approximately 0.8 inches. The thickness of the sides 12, 14, 16, 18 measured from the inner surface 34 to the outer surface 36 is approximately 0.42 inches. The width of the hole 26 measured diametrically at its narrowest portion is 0.42 inches. This gives an overall volume of the briquet of 2.16 cubic inches, with an approximate weight of 0.056 pound. The surface area of the briquet is about 13.7 square inches. This compares to a standard pillow shaped briquet as is commercially available having a volume of 2.12 cubic inches, an approximate weight of 0.055 pound, and a surface area of 8.98 square inches. Thus, the briquet of the present invention having an approximately equal weight is provided with 150% of the surface area of the standard briquet. All of the above figures are approximate, as individual briquets vary considerably.

Referring now to FIGS. 6-8, one sees a stack of 19 identical briquets contained within a close fitting cardboard box. The box 50 has a back side 52, a right side 54, a front side 56, and a left side 58. The box is created from a single sheet of cardboard with an extension of the left side 58 being creased and then overlaying a portion of the front side 56 and adhered, as by gluing, to the front side 56. Thus, a sealed square container containing a stack of briquets 10 is illustrated. The box 50 is approximately 2.53 inches wide (outside) in both the right to left and front to back dimensions. This provides inside dimensions snugly accommodating the stack of charcoal briquets 10. Preferably, the box is made from cardboard coated with wax or a similar coating.

As can be seen in FIGS. 7 and 8, extensions are provided on the box side walls 52, 54, 56, 58 forming flaps which are folded and glued or otherwise interconnected forming a box bottom 62 and a box top 64. The flaps connected to the box side walls are conventional and glued together or fastened together in conventional ways.

As can be seen in FIGS. 7 and 8, the bottommost charcoal briquet 10a rests upon the bottom 62 of the box 50. The bottom surface 30 of the bottommost briquet 10a rests upon the cardboard bottom 62 around its entire periphery. A substantial bearing area is provided between the bottom 30 of the briquet 10a and the bottom of the box 62. The second lowest briquet 10b rests upon the lower briquet 10a with the lower surface 34 of each of the sides 12, 14, 16, 18 of the second briquet 10b resting on the upper surface 36 of the sides 12, 14, 16, 18 of the bottom briquet 10a. As can thus be seen in FIG. 8, the briquets engage one another over a substantial portion of the upper surface 36 of one briquet and lower surface 34 of the next higher briquet.

The briquets are substantially rectangular or square in outer peripheral shape. The downwardly facing lower surfaces 34 create a somewhat segmented downwardly facing concavity 70 having four separate continuous distinct surfaces on the four sides 12, 14, 16, 18. In the preferred embodiment, the concavity is not a surface of rotation resembling a cone. However, such a shape could be used in implementing the invention. The downwardly facing concavity 70 mates with an upwardly facing convexity 72 formed by the upper surfaces 36 of the four sides 12, 14, 16, 18. The mating of the concavity 70 and the convexity 72 as shown in the stack of FIG. 8 is self-centering. The most compact and stable disposition of the stack is with each of the briquets 10 centered and in full contact with the next lower briquet as illustrated in the figures.

The box 50 containing the single stack of charcoal briquets 10 is a stand alone retail package. Box 50 is printed with appropriate merchandising information, including a universal product code, and is shipped and sold as-is. The box 50 is rectilinear and therefore easily packed into cartons and palletized for handling and distribution. The box 50 is rectilinear and therefore easily stocked onto shelves, into end caps, or center-of-aisle displays at the retailer. The box 50 is sealed and therefore less likely to become contaminated with charcoal dust. The box 50 contains briquets 10 which are stacked in a stable, tight manner minimizing extra air space as well as friction and the creation of charcoal dust. The box 50 is easily purchased by the consumer, as its overall dimensions are approximately 2½.times.2½ inches' by 10⅔. This box weighs approximately one pound and is very easily picked up, placed into a shopping cart, taken home for use, easily stored at home, and easily and cleanly transported in a consumer's vehicle for use at a park or picnic.

In use, the consumer can simply place the box as-is in a grill bed. The wax coated box 50 is ignited and as the box 50 burns, it in turn ignites the periphery 32 of the contained charcoal briquets 10. As can be best seen in FIG. 8, the peripheral portions 32 are spaced from one another when compactly packed, with air gaps 76 provided between the briquet peripheries within the box to promote air flow as the box 50 burns, encouraging ignition of the briquet peripheral edges 32. After the briquets are ignited, the stack is broken up by use of a poker or other appropriate implement. Thereupon, a jumbled random bed of briquets is provided which has a greater surface area per unit mass than conventional briquets. The greater surface area encourages quick combustion to the ready-to-cook state. Moreover, the holes 26 in the centers of the briquets 10 provide an air flow passage causing a vortex action of air passing through the briquets 10, further encouraging combustion to the ready-to-cook temperature.

Referring now to FIGS. 9-11, a different method of packing the briquets 10 of the present invention is disclosed. FIGS. 9-11 illustrate a box of five pounds of identical briquets 10. The five-pound box contains six stacks of briquets disposed in two rows of three. Each of the six stacks comprises an identical number (15) of briquets and the briquets are tightly contained in a rectangular box 80 having four sides 82, 84, 86, 88. The box is constructed from a single sheet of wax-coated paper or cardboard with the sheet of cardboard having a tab extending slightly beyond the end of one of the sides 82 into an overlapping relationship with a second side 88 to which it is adhered. Flaps extend from the sides 82, 84, 86, 88 forming a box bottom 92 and a box top 94. The flaps are engaged as is conventional, forming a completely closed container. This five-pound box 80 of briquets is much more compact, easily handled, and less subject to damage than equivalent bags of briquets. The five-pound boxes are rectilinear, easing stacking and palletization. This greatly eases shipping of the product and prevents damage to the product in shipment. The rectangular boxes are easily stacked onto shelves, displayed as aisle end caps or otherwise displayed at the retailer for purchase by consumers. Moreover, the packages are fabricated from linear cardboard stock, and are therefore easily printed with merchandising information prior to forming into the box. The sealed boxes are relatively easy for consumers to handle, use and store. Optionally, the box is provided with an attached handle by fixing a plastic (or similar material) strap to the top or two opposite sides. The briquets in the box 80 stack in a self-centering manner identical to that seen in the box 50 of FIG. 6. A stable, compact mass of charcoal briquets is thereby provided.

In use, the consumer can either use the entire five-pound box in a manner similar to the one-pound box described above, or open the top of the five-pound box and pour a desired amount of briquets into a pile at the center of a grill. The pile of briquets can then be ignited as conventional. Such a pile of briquets has more favorable ignition characteristics when compared to conventional briquets because of the large surface area-to-mass provided by the briquet shape, and because of the vortex air flow created by the holes 26 in the middles of the briquets in the stack.

Figure 14:
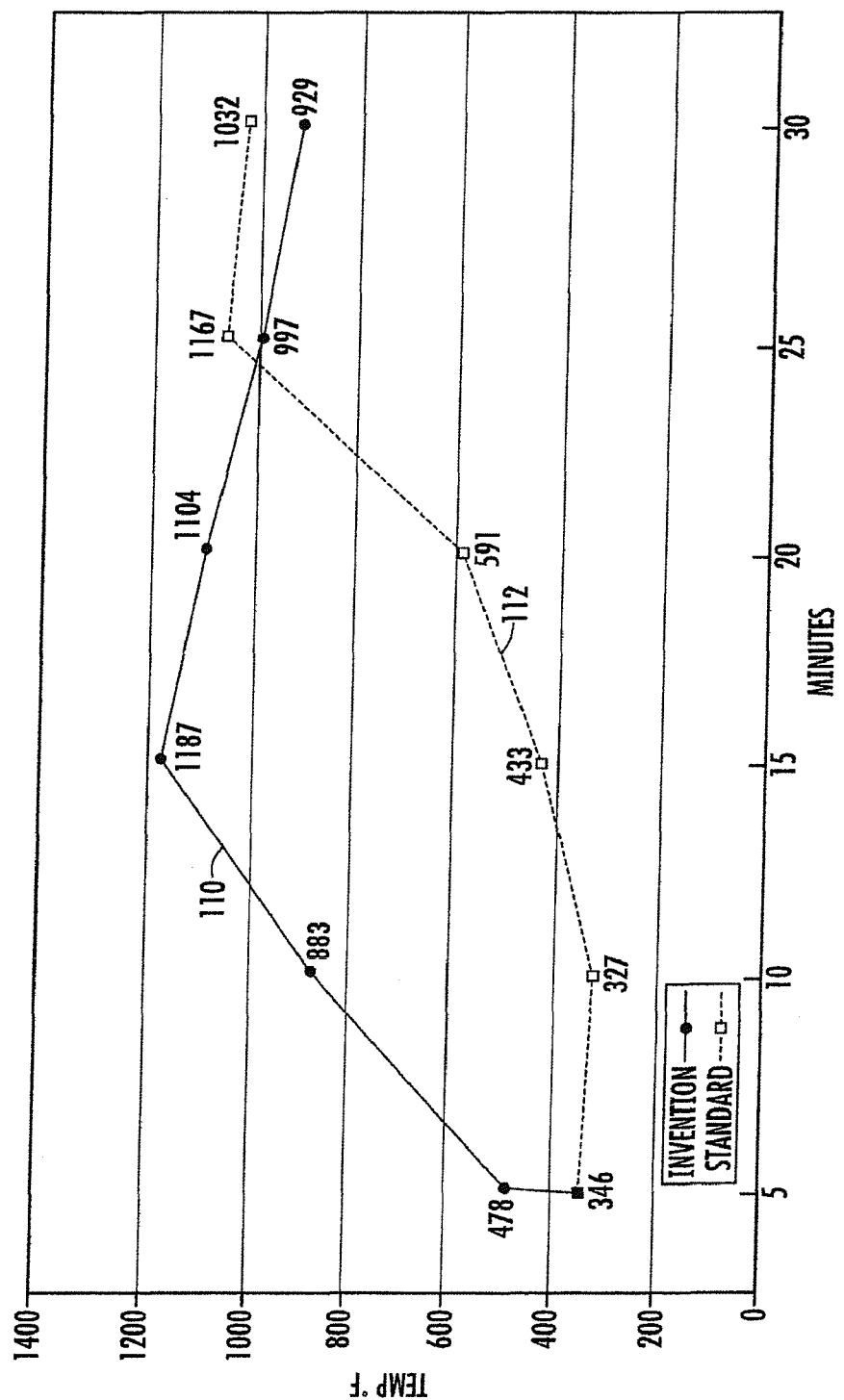
FIG. 14 is a graph showing a comparison of combustion temperature versus time for the briquets of the present invention and conventional standard briquets.
Figure 16:
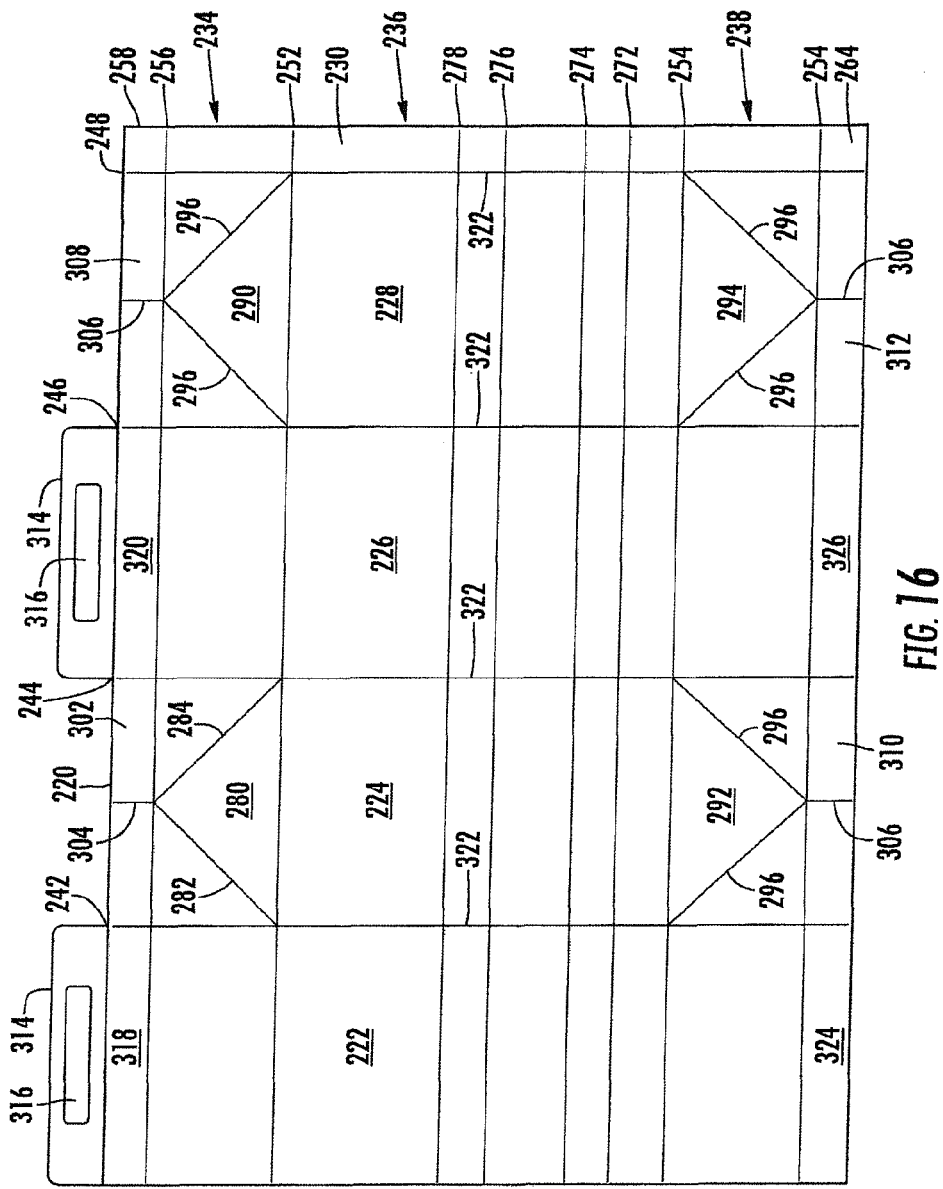
FIG. 16 is a plan view of a coated paperboard blank used in forming the inner container of the packaged charcoal product of FIG. 15.

FIG. 14 illustrates the progression from initial ignition (0 minutes) to the ready-to-cook condition of the charcoal briquets of the present invention, as compared to conventional standard charcoal briquets. Line 110 connects data points for the temperature of briquets in accordance with the invention. Line 112 connects data points for standard briquets. It can be seen that the charcoal briquets of the present invention reach a temperature in excess of 1000.degree. approximately 15 minutes after initial ignition, whereas such a temperature is not reached for conventional briquets for approximately 25 minutes. Moreover, the briquets of the present invention hold their ready-to-cook temperature of about 1000 degrees reasonably constantly thereafter. Temperature readings for tests conducted comparing the temperature at 5-minute intervals after initial ignition for the briquets of the present invention when compared to conventional briquets is set forth in Table 1 below.

TABLE 1

| MINUTES | INVENTION | CONVENTIONAL |
| --- | --- | --- |
| 5 | 478 | 346 |
| 10 | 883 | 327 |
| 15 | 1187 | 433 |
| 20 | 1104 | 591 |
| 25 | 997 | 1067 |
| 30 | 929 | 1032 |

As can be seen with reference to the above table and the accompanying FIG. 14, obtaining appropriate cooking temperature is hastened, and maintenance of that temperature is greatly improved.

Figure 12:
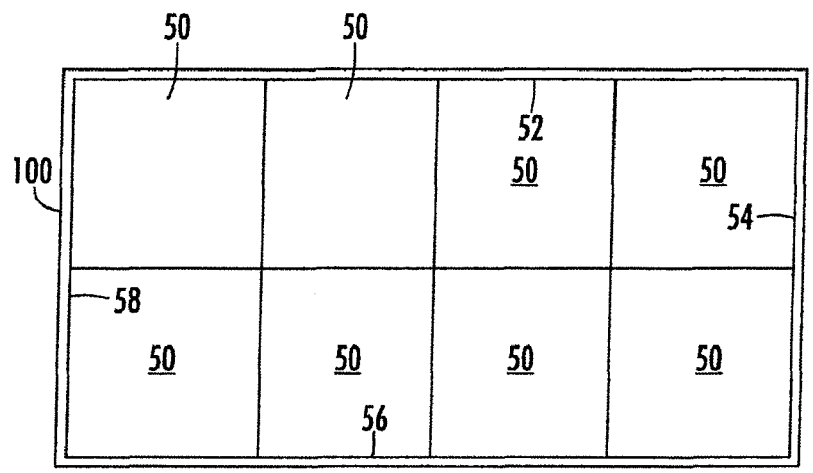
FIG. 12 is a top plan view of several individual use packages of briquets as seen in FIGS. 6-8 combined into a multiple unit product.
Figure 13:
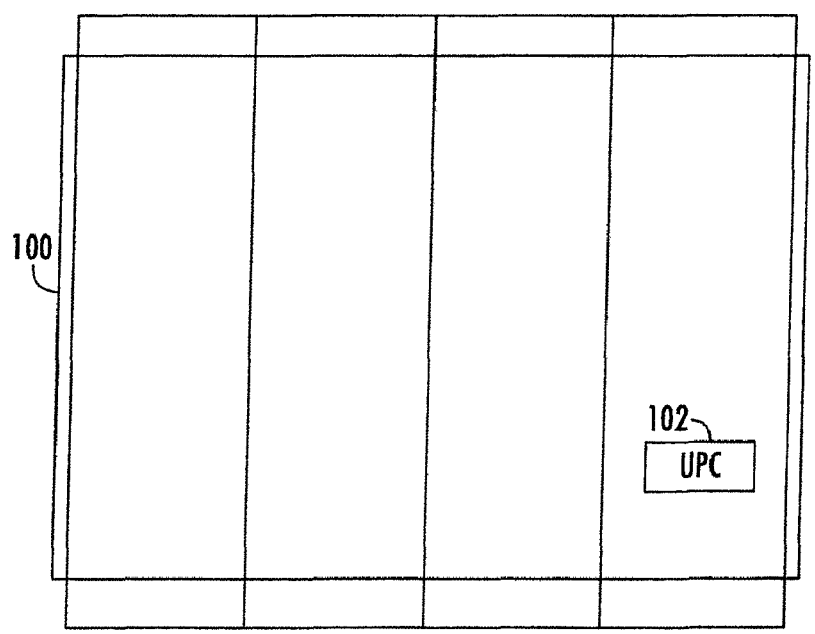
FIG. 13 is a side view of the multiple unit product of FIG. 12.

An alternative arrangement for packing multiple-pound units of briquets is shown in FIGS. 12 and 13. In FIG. 12, one sees a top view of eight boxes 50 identical in all respects to the package seen in FIGS. 6-8. The eight boxes 50 are held together by an outer wrapper 100 surrounding the sides 52, 54, 56, 58 of the closely-packed boxes 50. The outer wrapper 100 lays closely against boxes 50. The outer wrapper 100 is shown slightly spaced from the boxes 50 in the drawings for purposes of clarity only. The outer wrapper 100 is a wrap, such as a wide plastic wrap, which tightly binds the individual boxes 50 together into a single commercial product bearing its own universal product code 102 and marketing information. The outer wrapper 100 obscures the universal product code of the individual boxes 50 and allows the retailer to sell multiple units as a single package to consumers requiring or desiring more than a single pound of product. The consumer can easily handle the compact package, take it home, and remove separable one-pound boxes as desired. Moreover, the retailer can sell multi-unit packages in outer wrappers 100 or remove the outer wrapper 100 and sell individual one-pound packages 50 bearing their own marketing information. An outer box or similar container can be used in place of the wrapper 100.

Another embodiment of the invention is illustrated in FIGS. 15-26. FIG. 15 illustrates a packaged charcoal product 200. The product 200 is shaped like a conventional box in that it has a flat bottom 202 a flat top 204 and four flat side walls (only two of which are visible) 206, 208. While all of the top, bottom and side walls are generally flat, flaps, creases and joints which vary from absolute flatness do exist in most of these surfaces. The top 204 includes a handle 216 which can be upstanding as shown in FIG. 15 for use by the consumer in carrying the packaged charcoal product 200 or can lay flat against the top 204 as illustrated in FIG. 25. Thus, the packaged charcoal product 200 is generally a rectangular box which is easily stacked, palletized, and displayed on conventional retail shelves and the like. Moreover, the package has large flat surfaces available for merchandising information such as product directions, identifying trademarks and universal product codes. Thus, the product is easy to ship and merchandise and easy for the consumer to handle.

Figure 18:
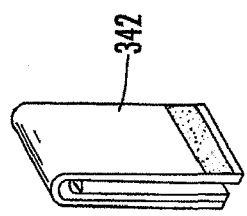
FIG. 18 is a perspective view of the interior walls used in the product of FIG. 15.

The product of FIG. 15 is comprised of several elements. These elements include an inner container fabricated from a sheet material blank shown in FIG. 16, an outer wrap fabricated from a blank seen in FIG. 17, inner divider walls as seen in FIG. 18, a match book shown in FIG. 19 and a number of charcoal briquets illustrated in FIGS. 21-24.

The inner container blank 220 is fabricated from stiff paperboard or the like coated on one side with paraffin. The paraffin coated side will be the inside of the inner container when it is assembled. The side of the blank which will face outwardly can optionally be coated with paraffin and may be printed upon with product instructions or the like. The inner container blank 220 is scored or creased vertically to divide the blank into a first side region 222, a second side region 224, a third side region 226, a fourth side region 228, and an overlap region 230. The creases separating the four side regions are straight, vertical and extend for the entire height of the blank 220 and will ultimately form the first corner 242, second corner 244, third corner 246 and fourth corner 248 of the inner container. The blank 220 is also scored or creased horizontally to create a top region 234, a side wall region 236 and a bottom region 238. A top crease 252 extends horizontally across the entire width of the blank 220 and separates the top region 234 and the side wall region 236. A bottom crease 254 extends horizontally across the entire width of the inner container blank 220 and separates a side wall region 236 and the bottom region 238. A top margin score or crease 256 separates the top region 234 from a top margin region 258. A bottom margin score or crease 262 extends horizontally across the entire width of the blank 220 and separates the bottom region 238 from a bottom margin region 264.

A lower opening score line or crease 272 extends horizontally across the entire blank 220 near the bottom of the side wall region 236. A first intermediate opening crease 274 extends horizontally across the blank and is spaced above the lower opening crease 272. A second intermediate opening crease 276 is spaced above the first intermediate opening crease 274 parallel to it. An upper opening crease 278 is spaced above the second intermediate opening crease 276 and parallel to it. All four opening crease lines are in the lower portion of the side wall region 236.

The intersection of the various horizontal and vertical regions described above creates a number of subregions. The second side region 224 intersecting the top region 234 creates a second side top region 280. The second side top region 280 is approximately twice as wide as it is high. The second side top region is provided with oblique creases 282, 284 extending from the lower corners of the second side top region 280 to the center of the top of the second side top region 280. The oblique creases 282, 284 are at angles of 45 degrees with respect to the top crease 252 and the top margin crease 246. The oblique creases 282, 284 divide the second side top region 280 into three right isosceles triangles. The fourth side top region 290, the second side bottom region 292 and the fourth side bottom region 294 all contain oblique creases 296 identical to those in the second side top region 280 and have width and height dimensions identical to the second side top region 280.

The second side top margin region 302 is provided with a vertical crease 304 at its center. The vertical crease 304 extends from the intersection of the oblique angles 282, 284 in the second side top region 280 to the top edge of the blank 220. Identical vertical creases 306 are provided in the fourth side top margin region 308, second side bottom margin region 310 and fourth side bottom margin region 312. Identical handle extensions 314 having apertures 316 extend from the tops of the first side top margin region 318 and the third side top margin region 320. The apertures 316 are sized to allow one to pass one's fingers through the apertures in carrying the packaged charcoal product 200.

The four corners 242, 244, 246 and 248 are significantly weakened between the lower opening crease 272 and the upper opening crease 278. In the preferred embodiment the four corners are slit completely through in this region. This provides four parallel slits 322 in the lower portions of the four corners 242, 244, 246, 248.

All of the scores, creases, slits and apertures described above are easily created in a die cutting operation on a web press which may also apply printing to one or both sides of the blank 220.

The inner container blank 220 is folded along the four corners 242, 244, 246, 248 and the overlap region 230 is fixed to the first side region 222 by adhesive or similar means. One of the flat bottom 202 or the flat top 204 is then closed. If the bottom is selected for closure, the bottom region 238 is folded such that the second side bottom margin region 310 and the fourth side bottom margin region 312 fold inwardly around the vertical creases 306 and the first side bottom margin region 324 and the third side bottom margin region 326 are drawn together. The second side bottom region 292 and fourth side bottom region 294 also fold along oblique crease lines 296. This creates a bottom having a resemblance to a conventional milk carton. However, because the second side bottom region 292 and fourth side bottom region 294 are both about twice as wide as they are tall, the folded portions of the bottom regions lie against one another and the bottom is flat. The four bottom margin regions 324, 310, 326, 312 all lie against one another and the bottom margin is folded over and adhered to the flat bottom 202. If the second side bottom region and fourth side bottom region had widths which were other than twice their heights, then the oblique creases 296 would be other than 45 degrees and the familiar tent shape of a milk carton would be created rather than a flat bottom. The first side bottom region and third side bottom region can depart from this relationship of width twice the height without interfering with the flat bottom described above.

Figure 17:
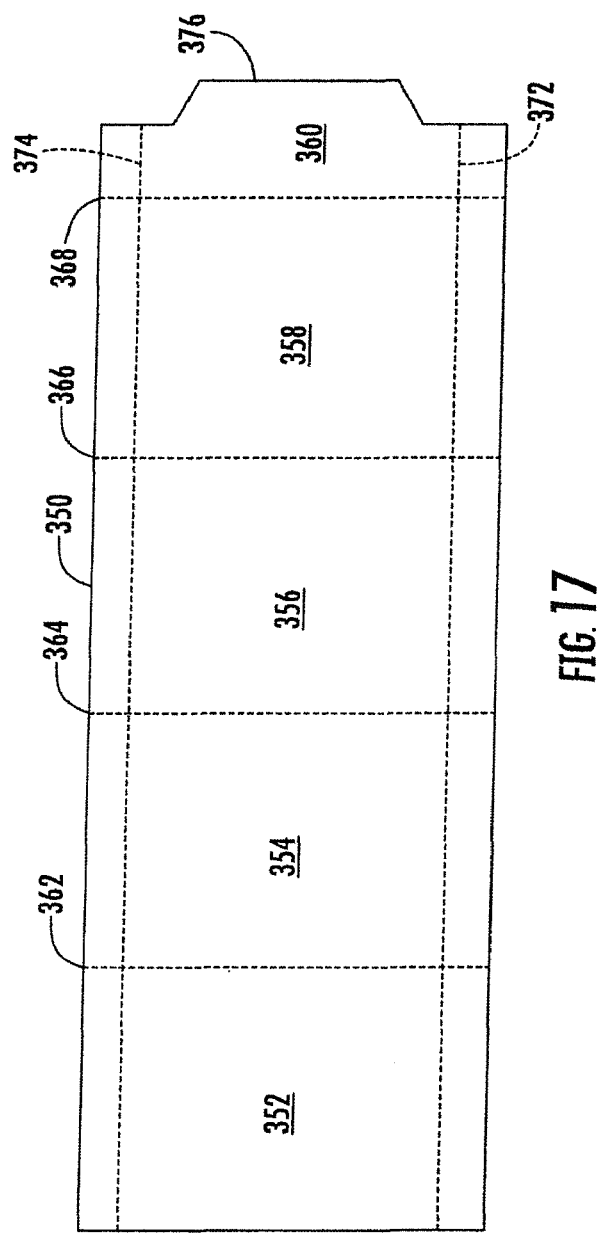
FIG. 17 is a plan view of a blank for an outer wrap used in the packaged product of FIG. 15.
Figure 21:
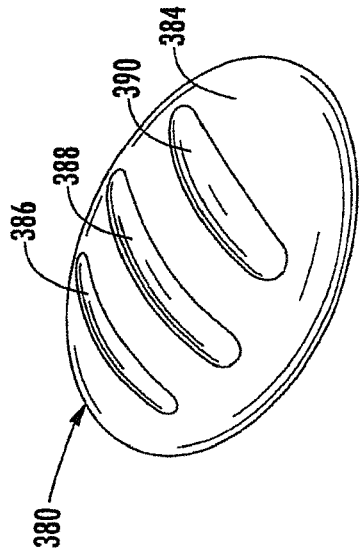
FIG. 21 is a perspective view of a charcoal briquet as packaged into the package of FIG. 15.
Figure 22:
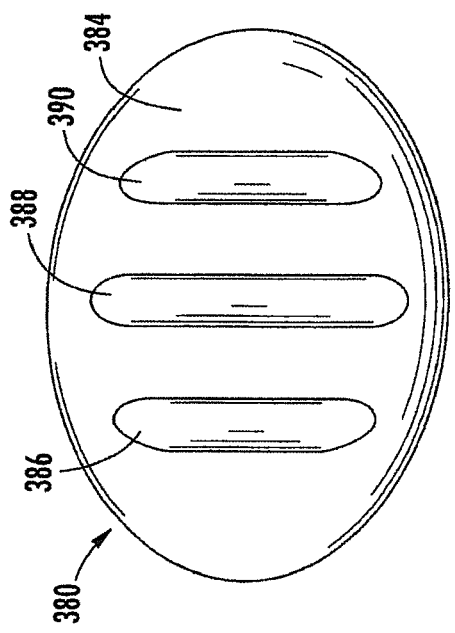
FIG. 22 is a top plan view of the charcoal briquet of FIG. 21.
Figure 24:
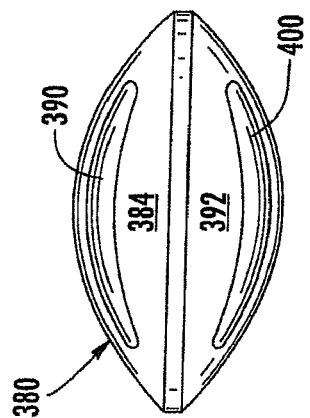
FIG. 24 is a side view of the charcoal briquet seen in FIGS. 21-23.

FIG. 17 shows an outer wrap blank 350 which is created from sheet stocks such as paper board and is generally rectangular. The outer wrap blank 350 is divided into a first side region 352, a second side region 354, a third side region 356, a fourth side region 358 and an overlap region 360 by vertical creases. The vertical creases form a first corner 362, a second corner 364, a third corner 366, and a fourth corner 368 when the outer wrap blank 350 is wrapped about the inner container 350 to form the outer wrap 370. The outer wrap blank 350 is also provided with a bottom perforation line 372 and a top perforation line 374. A pull tab 376 extends from the side edge of the overlap region 360. As can be seen in FIGS. 25 and 15, the outer wrap blank 350 is folded along the four corners 362, 364, 366, 368 and applied around the inner container 340 with the overlap region overlaying the first side region 352. The outer wrap blank 350 is fixed to the inner container 340 by adhesive applied below the bottom perforation line 372 and above the top perforation line 374. Adhesive is not applied to the portions of the outer wrap blank 350 between the bottom perforation line 372 and top perforation line 374. The book of matches 342 is contained between the outer wrap 370 and the inner container 340.

FIG. 18 shows a component disposed within which the inner container blank 220 after final assembly. Divider walls 330 comprise two rectangular pieces of corrugated cardboard 332, 334 which are heavily coated with paraffin. The two pieces of cardboard 332, 334 are joined at their centers as by vertically cutting for half their height and interengaging. The length of the cardboard pieces 332, 334 can be identical to the interior diagonals between the corners 242-246 and 244-248 respectively. The divider walls 332 are received and retained within the inner container 340 at its bottom.

Figure 19:
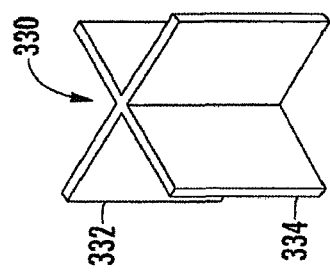
FIG. 19 is a perspective view of the match package used in the packaged product of FIG. 15.

FIG. 19 shows a book of matches 342. The book of matches is a conventional book of several paper matches in a book form carrying a striker on the outer surface.

Figure 23:
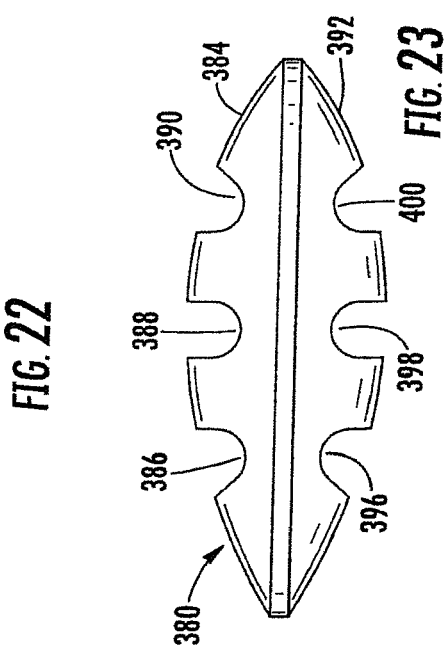
FIG. 23 is a front view of the charcoal briquet of FIG. 21.

A selected weight of charcoal briquets are contained within the inner container 340. The charcoal briquets are generally identical to one another and have a pillow shape. One of the briquets is seen in FIGS. 21-24. A typical charcoal briquet 380 is pillow shaped with an elliptical periphery 382 when viewed from the top. As seen in FIG. 23, the briquet 380 has a convex curved top surface 384 with three deep grooves 386, 388, 390 extending across the short dimension of the top surface 384. The briquets 380 are symmetrical with respect to a horizontal plane passing through its center. Thus, the bottom surface 392 is also convex and there are three deep grooves 396, 398, 400 in the bottom surface 392. At their deepest points, the individual grooves have a depth dimension of about 25% of the maximum depth dimension of the briquet. As seen in FIG. 23, the top center groove 388 and the bottom center groove 398, together occupy about 50% of the height of the briquet 380. The grooves are about as wide as their maximum depth. A quantity of briquets, typically about 2½ pounds is filled in to the inner container 340 before it is completely closed. After inclusion of the briquets 380, the top regions 234, top margin region 258 and handle extensions 314 are brought together in a manner similar to that described for the bottom region 238. The two handle extensions 314 form the handle 216 which can extend above the flat top 204 or be folded down to lay against the flat top 204. This completed product configuration, as seen in FIG. 15, is box-like, easily stacked and palletized, and is dust tight. The four slits 322 in the four corners 242, 244, 246 and 248 of the inner container 340 are held closed and sealed by the outer wrap 370. Thus, an easily shipped, stored and merchandised commercial product is presented.

FIG. 25 shows the first step in use of the product 200 by the ultimate consumer. After purchasing the product, the consumer takes the packaged charcoal product 200 to the place of intended use, typically a backyard grill or barbeque. The product is placed in the bed of the charcoal grill or similar device and the outer wrap 370 is removed by grasping the pull tab 376 an pulling it away from the inner container 340. The outer wrap 370 separates along the perforation lines 372, 374 releasing the book of matches 342. The outer wrap 370 may be placed under or near the inner container 340 or discarded. The inner container 340 is then vertically compressed as seen in FIG. 26. The vertical compression causes the four side regions 222, 224, 226, 228 to bulge outwardly between the bottom crease 254 and the top crease 252. This opens the four corner slits 322 allowing some of the charcoal briquets 380 to spill out of the split corners. However, the interior divider walls 330 retain many of the charcoal briquets 380 within the inner container 340. The consumer can then use the matches in the book of matches 342 to ignite one or more of the side regions 222, 224, 226, 228.

Importantly, the top half 410 of the inner container 340 is not split and remains intact as a cap over the center of the pile of charcoal briquets 380. The top half 410 retains heat within the pile of briquets aiding ignition of all the briquets 380. Also, the deep grooves 386, 388, 390, 396, 398, 400 aid combustion by providing air circulation within the pile of briquets 380 while still allowing close contact between adjacent briquets for the spreading of combustion. Air flow between the four corner slits 322 supports combustion while the closed top half 410 prevents the rapid escape of hot products of combustion from the top of the pile of briquets 380. This aids in the ignition of the briquets.

The wax coated divider walls 330 provide fuel for initiating combustion of the briquets as does the wax coated on the inside of the inner container 340. Moreover, this configuration and wax coating prevents the inner container from burning too quickly thus providing a cover over the center of the pile of briquets during the critical initial ignition phase. Once the charcoal briquets are all ignited, the inner container burns away and the consumer is left with an ignited body of briquets appropriate for cooking.

Figure 27:
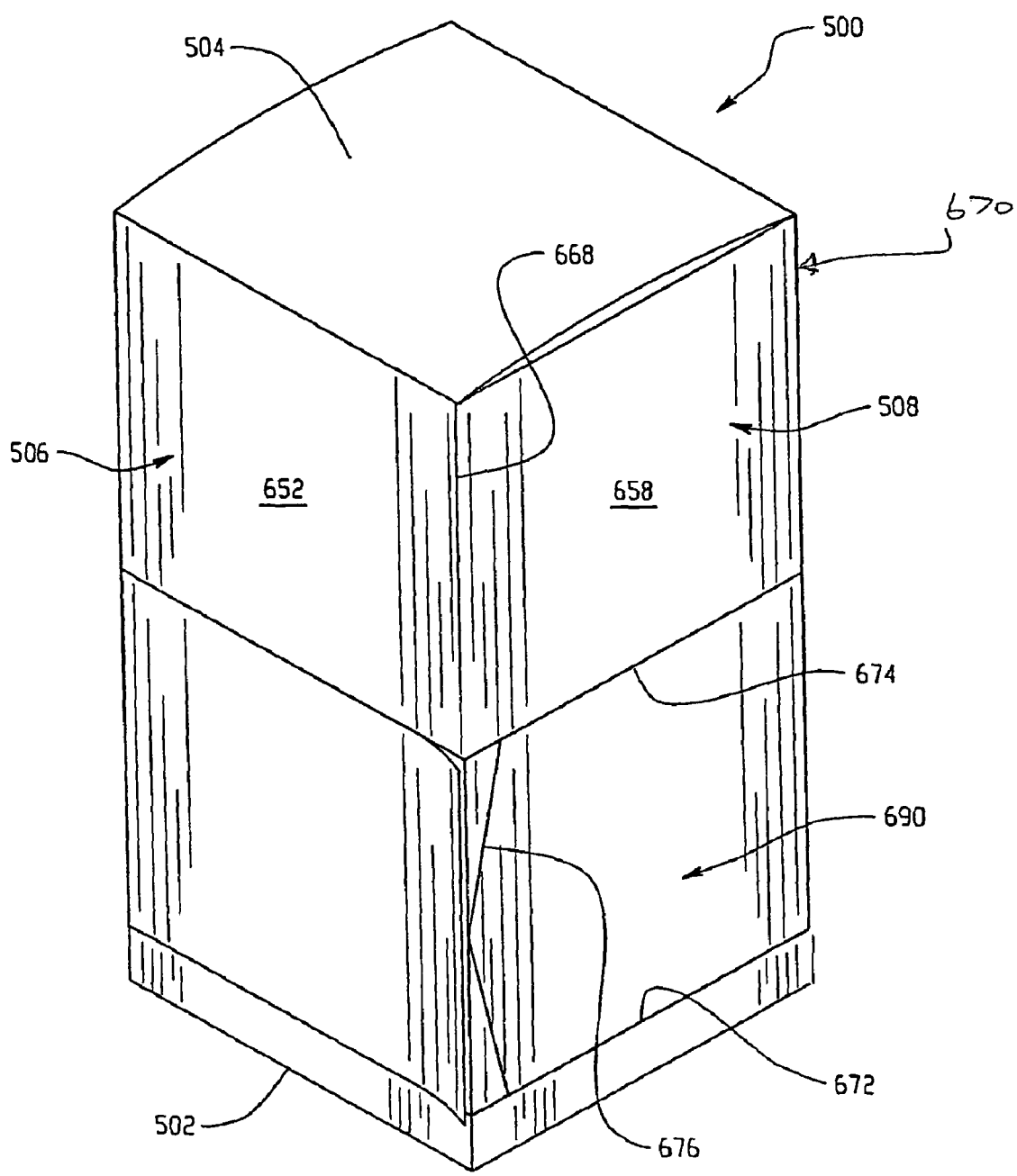
FIG. 27 is a perspective view of still another embodiment of the packaged charcoal product in the complete packaged-configuration.
Figure 28:
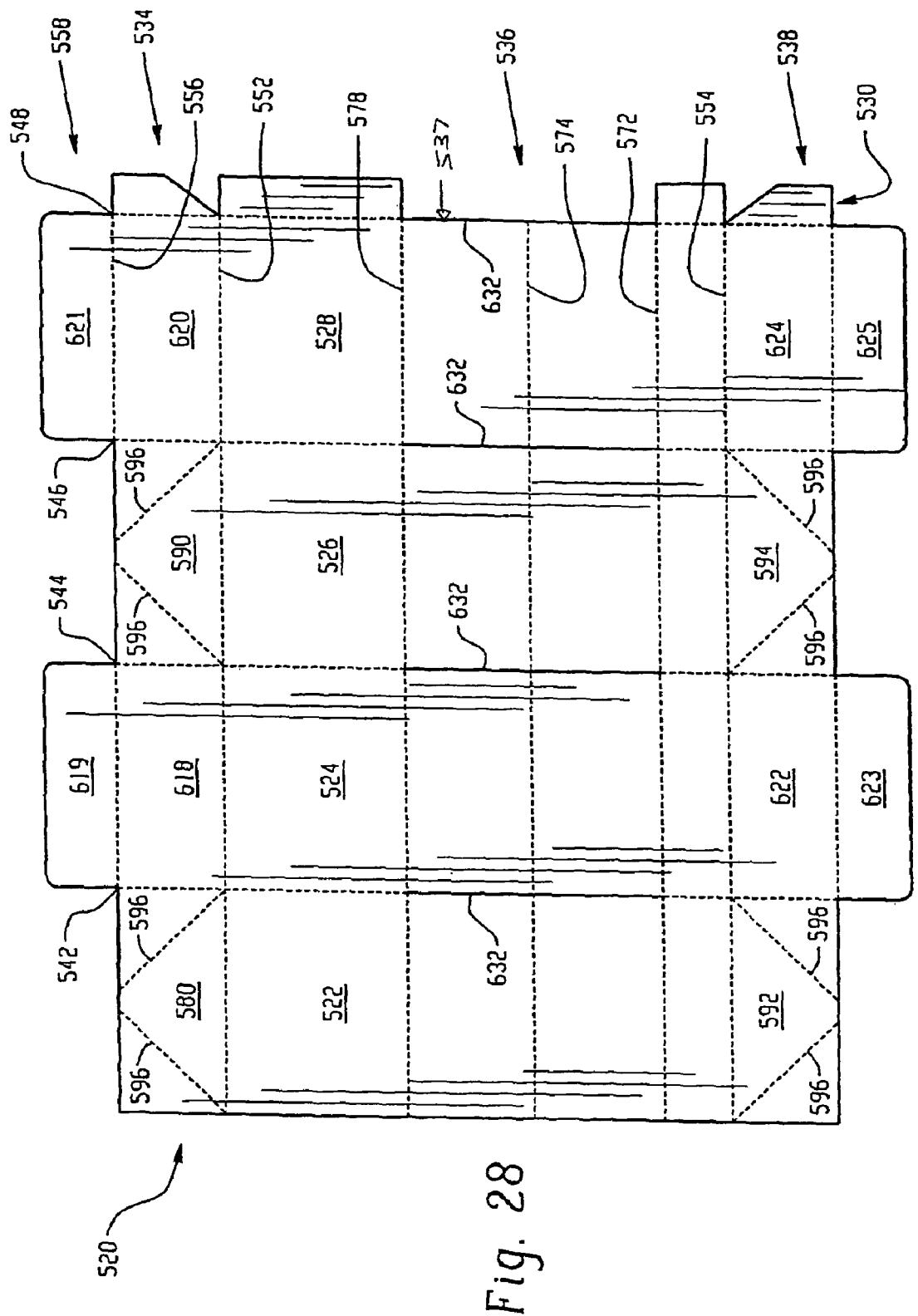
FIG. 28 is a plan view of a coated paperboard blank used in forming the inner container of the packaged charcoal product of FIG. 27.

Yet another embodiment of the invention is illustrated in FIGS. 27-35. FIG. 27 illustrates a packaged charcoal product 500. The product 500 is shaped like a conventional box in that it has a flat bottom 502 a flat top 504 and four flat side walls (only two of which are visible) 506, 508. While all of the top, bottom and side walls are generally flat, flaps, creases and joints which vary from absolute flatness do exist in most of these surfaces. Thus, the packaged charcoal product 500 is generally a rectangular box which is easily stacked, palletized, and displayed on conventional retail shelves and the like. Moreover, the package has large flat surfaces available for merchandising information such as product directions, identifying trademarks and universal product codes. Thus, the product is easy to ship and merchandise and easy for the consumer to handle.

The product of FIG. 27 can be comprised of several elements. These elements include an inner container 520 fabricated from a sheet material blank shown in FIG. 28, an outer wrap 670 fabricated from a blank 650 seen in FIG. 29, inner divider walls as seen in FIG. 18, and a number of charcoal briquets illustrated in FIGS. 30-33.

The inner container blank 520 is fabricated from stiff paperboard or the like coated on one side with paraffin. The paraffin coated side will be the inside of the inner container when it is assembled. The side of the blank which will face outwardly can optionally be coated with paraffin and may be printed upon with product instructions or the like. The inner container blank 520 is scored or creased vertically to divide the blank into a first side region 522, a second side region 524, a third side region 526, a fourth side region 528, and an overlap region 530. The creases separating the four side regions are straight, vertical and extend for the entire height of the blank 520 and will ultimately form the first corner 542, second corner 544, third corner 546 and fourth corner 548 of the inner container. The blank 520 is also scored or creased horizontally to create a top region 534, a side wall region 536 and a bottom region 538. A top crease 552 extends horizontally across the entire width of the blank 520 and separates the top region 534 and the side wall region 536. A bottom crease 554 extends horizontally across the entire width of the inner container blank 520 and separates the side wall region 536 and the bottom region 538.

A lower score line or crease 572 extends horizontally across the entire blank 520 near the bottom of the side wall region 536. An intermediate score line or crease 574 extends horizontally across the blank and is spaced above the lower crease 572. An upper score line or crease 578 is spaced above the intermediate crease 574 and parallel to it. All three crease lines are in a lower portion 537 of the side wall region 536.

The intersection of the various horizontal and vertical regions described above create a number of subregions. The first side region 522 intersecting the top region 534 creates a first side top region 580. The first side top region 580 is approximately twice as wide as it is high. The first side top region 580 is provided with oblique creases 596 extending from the lower corners of the first side top region 580 to the proximal center of the top of the first side top region 580. The oblique creases 596 are at angles of approximately 45 degrees with respect to the top crease 552 and the top margin crease 556. The oblique creases 596 divide the first side top region 580 into three right isosceles triangles. The third side top region 590, the first side bottom region 592 and the third side bottom region 594 all contain oblique creases 596 identical to those in the first side top region 580 and have width and height dimensions identical to the first side top region 580.

A second side top region 618 is provided with a second side top margin region 619. A fourth side top region 620, a second side bottom region 622, and a fourth side bottom region 624 are provided with side margin regions 621, 623, 625.

The four corners 542, 544, 546 and 548 are significantly weakened between the lower crease 572 and the upper crease 578. In one embodiment the four corners are slit completely through in this region. This provides four parallel slits 632 in the lower portion 537 of the side wall region 536 along the four corners 542, 544, 546, 548.

All of the scores, creases, slits and apertures described above are easily created in a die cutting operation on a web press which may also apply printing to one or both sides of the blank 520.

The inner container blank 520 is folded along the four corners 542, 544, 546, 548 and the overlap region 530 is fixed to the first side region 522 by adhesive or similar means. One of the bottom region 538 or the top region 534 is then closed. If the bottom is selected for closure, the bottom region 538 is folded such that the first side bottom region 592 and the third side bottom region 594 fold inwardly around the bottom crease 554 and the second side bottom margin region 623 and the fourth side bottom margin region 625 are drawn together. The first side bottom region 592 and third side bottom region 594 also fold along oblique crease lines 596. However, because the first side bottom region 592 and third side bottom region 594 are both about twice as wide as they are tall, the folded portions of the bottom regions lie against one another and the bottom is flat. The two side bottom margin regions 623, 625 lie against one another and the bottom margin is folded over.

Figure 29:
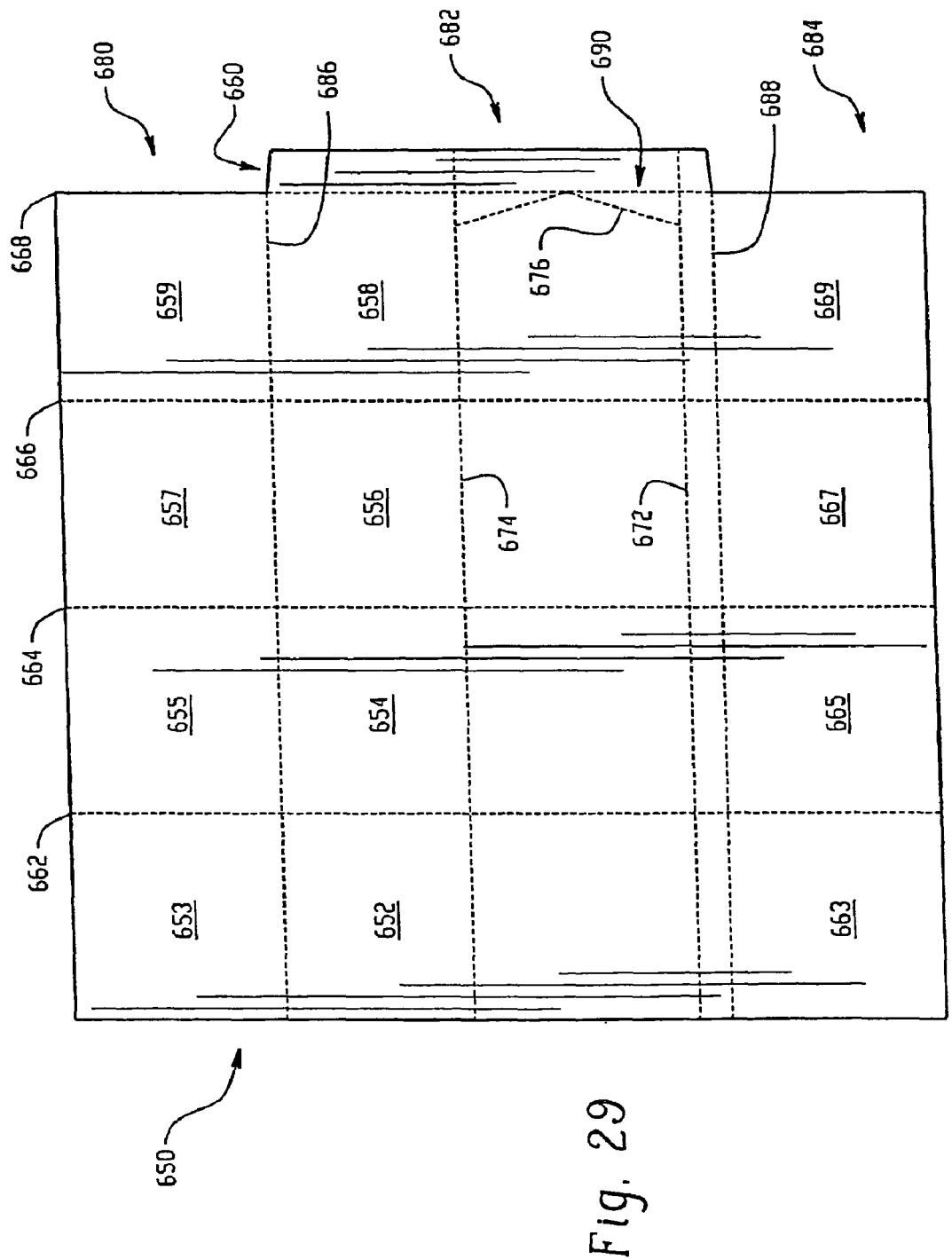
FIG. 29 is a plan view of a blank for an outer wrap used in the packaged product of FIG. 27.
Figure 30:
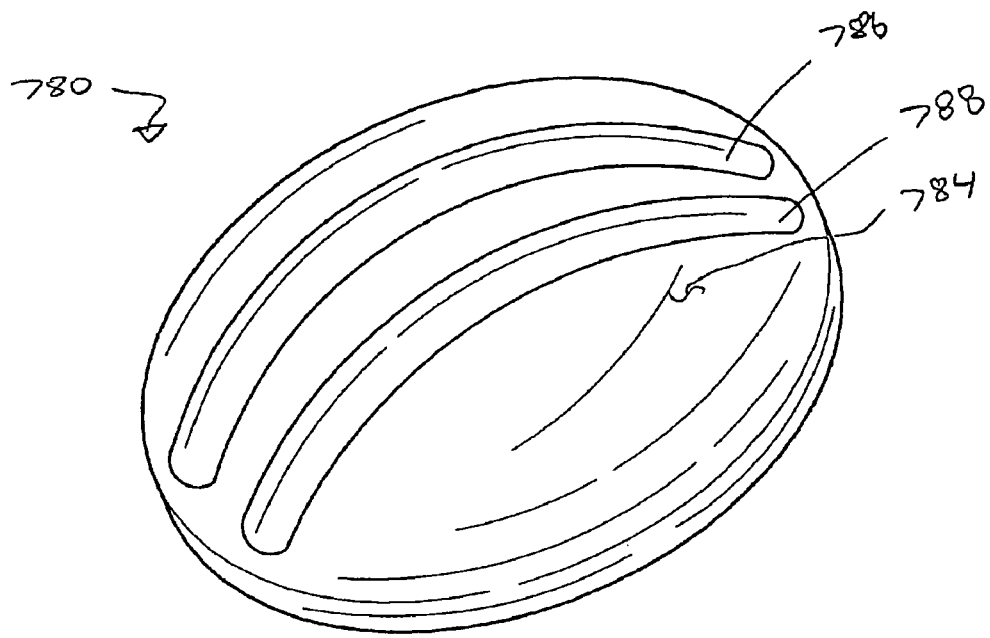
FIG. 30 is a perspective view of another embodiment of a charcoal briquet as packaged into the package of FIG. 27.
Figure 31:
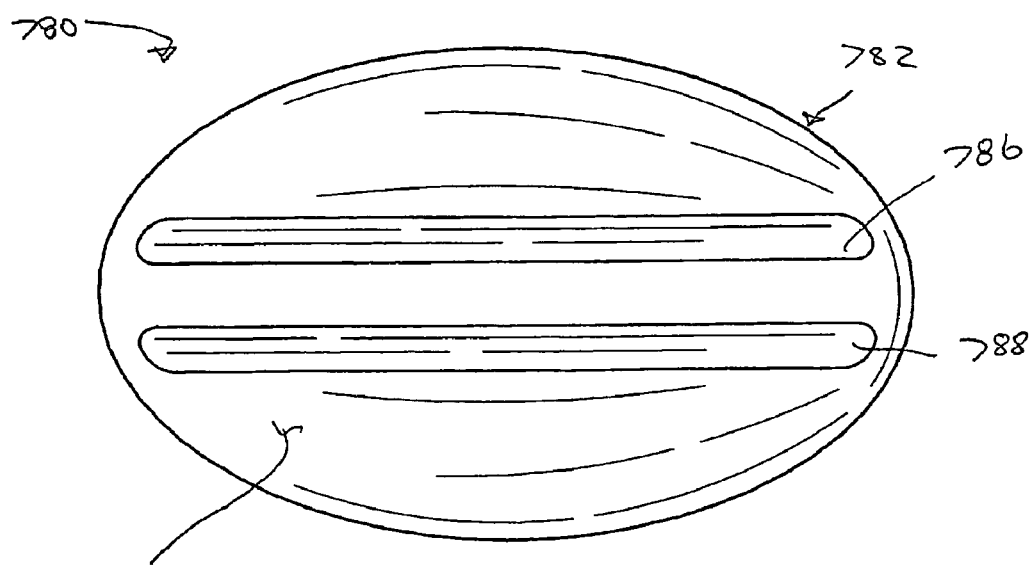
FIG. 31 is a top plan view of the charcoal briquet of FIG. 30.
Figure 34:
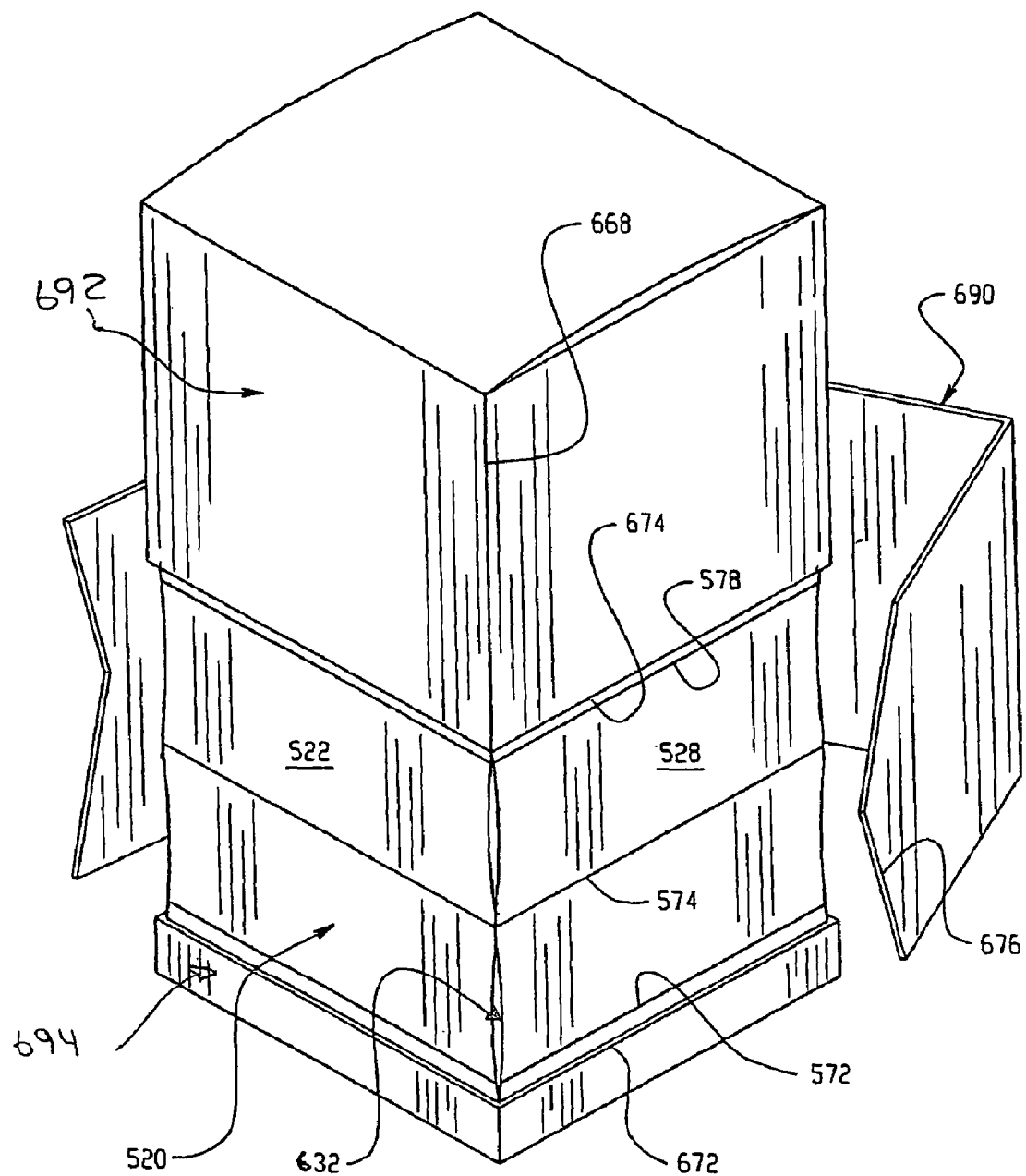
FIG. 34 is a view similar to FIG. 27 showing the packaged charcoal product partially opened in preparation for use by the consumer.

FIG. 29 shows an outer wrap blank 650 which is created from sheet stocks such as paper board and is generally rectangular. The outer wrap blank 650 is divided into a first side region 652, a second side region 654, a third side region 656, a fourth side region 658 and an overlap region 660 by vertical creases. The vertical creases form a first corner 662, a second corner 664, a third corner 666, and a fourth corner 668 when the outer wrap blank 650 is wrapped about the inner container 520 to form the outer wrap 670. The outer wrap blank 650 is also provided with a bottom perforation line 672 and a top perforation line 674. A perforated generally vertically oriented or V-shaped line 676 extends between the bottom perforation line 672 and the top perforation line 674. As can be seen in FIGS. 34 and 27, the outer wrap blank 650 is folded along the four corners 662, 664, 666, 668 and applied around the inner container 520 with the overlap region 660 underlying the first side region 652. The outer wrap blank 650 is also scored or creased horizontally to create a top region 680, a side wall region 682, and a bottom region 684. A top crease 686 extends horizontally across the entire width of the blank 650 and separates the top region 680 and the side wall region 682. A bottom crease 688 extends horizontally across the entire width of the outer blank 650 and separates the side wall region 682 and the bottom region 684. It is to be appreciated that horizontal score lines 672, 674 and vertically oriented score line 676 define a selectively removable band or band portion 690 of the side wall region 682.

The intersection of the various horizontal and vertical regions described above create a number of subregions. The first side region 652 intersecting the top region 680 and the bottom region 684 creates a first side top region 653 and a first side bottom region 663. Similarly, side regions 654, 656, and 658, in conjunction with the top region 680 and the bottom region 684, create side top regions 655, 657, and 659 and side bottom regions 665, 667, and 669. The outer wrap 670 completely encapsulates inner container 520 in the assembled product 500 (FIG. 27). The outer wrap 670 provides another barrier thereby preventing inadvertent escape of charcoal briquet residue.

Figure 32:
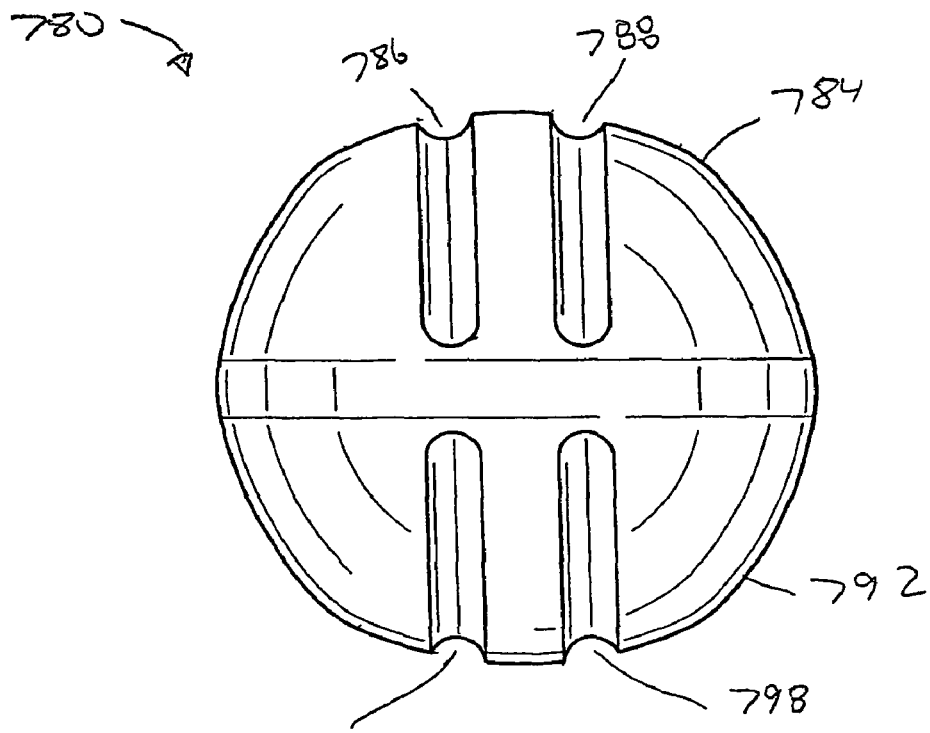
FIG. 32 is a side view of the charcoal briquet of FIG. 30.
Figure 33:
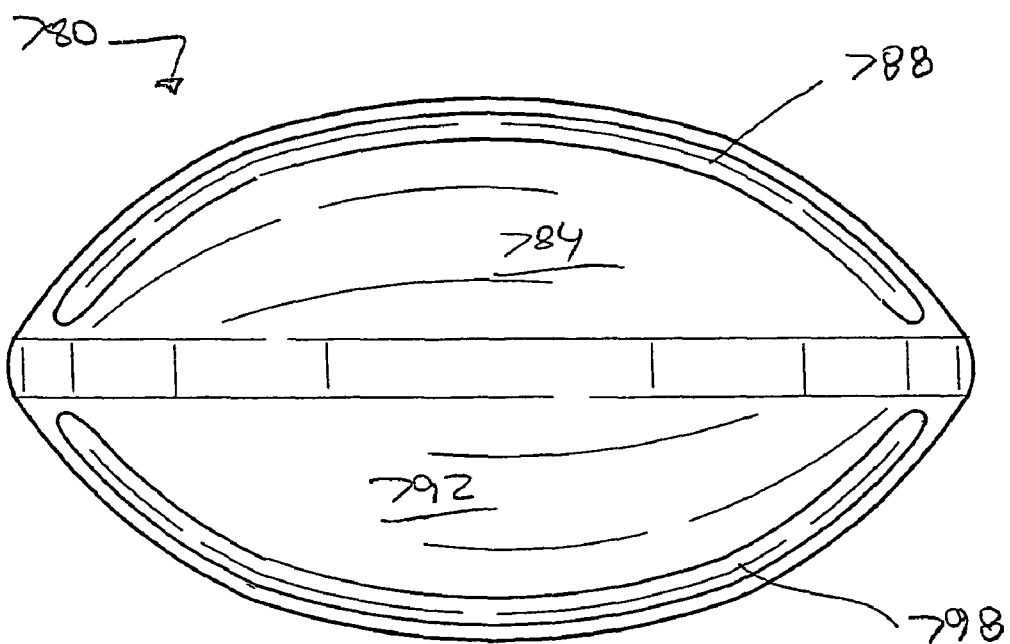
FIG. 33 is a front view of the charcoal briquet seen in FIGS. 30-32.

A selected weight of charcoal briquets are contained within the inner container 520. The charcoal briquets are generally identical to one another and have a pillow shape. Another embodiment of the briquet is seen in FIGS. 30-33. A typical charcoal briquet 780 is pillow shaped with an elliptical periphery 782 when viewed from the top. As seen in FIG. 32, the briquet 780 has a convex curved top surface 784 with two grooves 786, 788 extending across the long dimension or major axis of the top surface 784. The briquet 780 is symmetrical with respect to a horizontal plane passing through its center. Thus, the bottom surface 792 is also convex and there are two grooves 796, 798 in the bottom surface 792. The grooves can have a width about as wide as their maximum depth. A quantity of briquets, typically about 2½ pounds is filled in to the inner container 520 before it is completely closed. After inclusion of the briquets 780, the top region 534 and the top margin region 558 are brought together in a manner similar to that described for the bottom region 538.

The inner container 520 is then wrapped with outer wrap blank 650. This completed product configuration, as seen in FIG. 27, is box-like, easily stacked and palletized, and is dust tight. The four slits 632 in the four corners 542, 544, 546 and 548 of the inner container 520 are held closed and sealed by the outer wrap 670. Thus, an easily shipped, stored and merchandised commercial product is presented.

Figure 35:
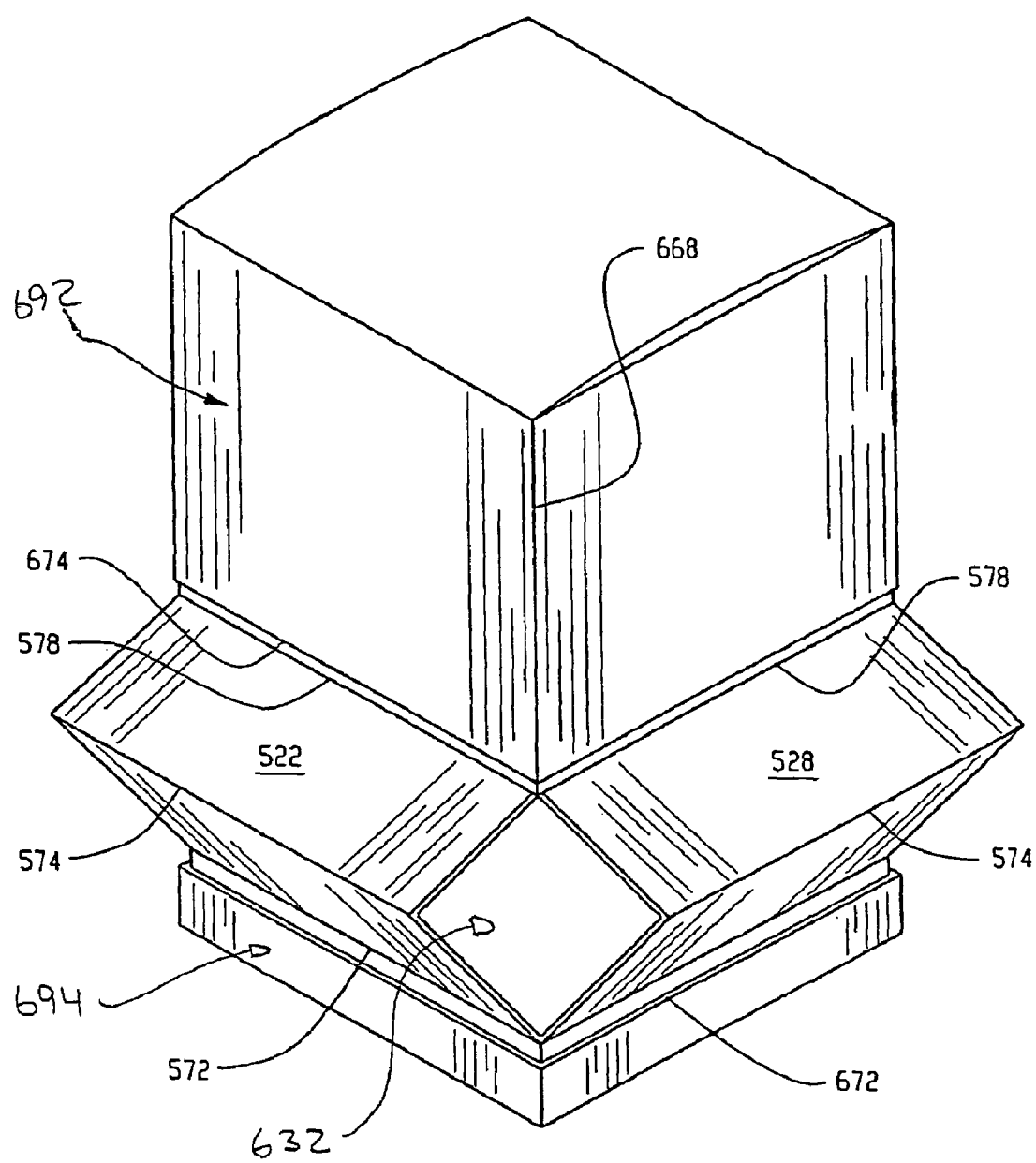
FIG. 35 is a perspective view of the packaged charcoal product of FIGS. 27-34 fully opened just prior to ignition by the consumer.

FIG. 34 shows the first step in use of the product 500 by the ultimate consumer. After purchasing the product, the consumer takes the packaged charcoal product 500 to the place of intended use, typically a backyard grill or barbeque. The product is placed in the bed of the charcoal grill or similar device and the band portion 690 of the outer wrap 670 is removed by separating perforated line 676 and pulling band portion 690 away from the inner container 520. The band portion 690 separates along the perforation lines 672, 674 while an upper portion 692 and a lower portion 694, of the outer wrap 670, remain intact. The band portion 690 of the outer wrap 670 may be placed under or near the inner container 520 or discarded. The inner container 520 is then vertically compressed as seen in FIG. 35. The vertical compression causes the four side regions 522, 524, 526, 528 to bulge outwardly between the bottom crease 572 and the top crease 578. This expands the four corner slits 632 allowing some of the charcoal briquets to spill out of the split corners (not illustrated). However, the interior divider walls 330 retain many of the charcoal briquets 780 within the inner container 520. The consumer can then use a match, or similar, to ignite one or more of the side regions 522, 524, 526, 528.

Importantly, the top half (not illustrated) of the inner container 520 is not split and remains intact as a cap over the center of the pile of charcoal briquets 780. The top half retains heat within the pile of briquets aiding ignition of all the briquets 780. Also, the grooves 786, 788, 796, 798 aid combustion by providing air circulation within the pile of briquets 780 while still allowing close contact between adjacent briquets for the spreading of combustion. Air flow between the expanded four corner slits 632 supports combustion while the closed top half prevents the rapid escape of hot products of combustion from the top of the pile of briquets 780. This aids in the ignition and combustion of the briquets.

The wax coated divider walls 330 provide fuel for initiating combustion of the briquets as does the wax coated on the inside of the inner container 520. Moreover, this configuration and wax coating prevents the inner container from burning too quickly thus providing a cover over the center of the pile of briquets during the critical initial ignition phase. Once the charcoal briquets are all ignited, the inner container burns away and the consumer is left with an ignited body of briquets appropriate for cooking.

The specific top configuration and bottom configuration described provides advantages; however, one can practice the invention using other top and bottom configurations as the top and bottom of the container need never be opened after the charcoal briquets are filled into the inner container. Thus, alternative designs in which flat rectangular panels form the top and bottom are appropriate so long as they provide a good seal. An outer wrap leaving portions of the side walls exposed but covering and sealing the slits 322, 632 would obtain the advantages of the invention.

Figure 36:
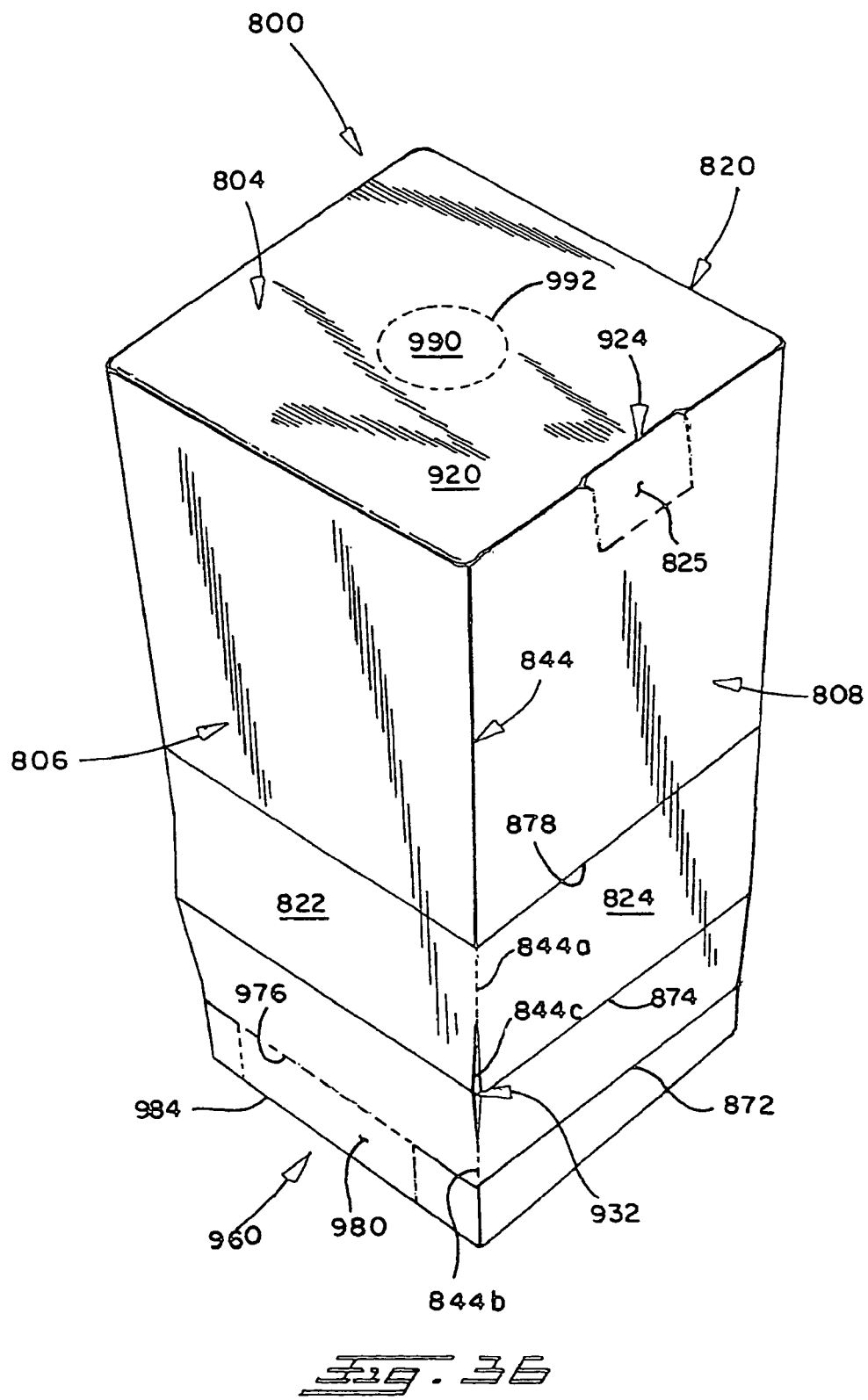
FIG. 36 is a perspective view of yet a further embodiment of the packaged charcoal product in the packaged configuration.

A further embodiment of the invention is illustrated in FIGS. 36-45. FIG. 36 illustrates a packaged charcoal product 800. The product 800 is shaped like a conventional box in that it has a flat bottom 802, a flat top 804, and four flat side walls (only two of which are visible) 806, 808. While all of the top, bottom and side walls are generally flat; flaps, creases and joints which vary from absolute flatness do exist in most of these surfaces. The package has large flat surfaces available for merchandising information such as product directions, identifying trademarks and universal product codes. Thus, the product is easy to ship and merchandise and easy for the consumer to handle.

The product of FIG. 36 can be comprised of several elements. These elements include a container 820 fabricated from a sheet material blank shown in FIG. 37, an insert 940 forming inner divider walls as seen in FIG. 38, a number of charcoal briquets 780 (i.e. as illustrated in FIGS. 30-33), and a plastic outer wrap (not shown) for encapsulating container 820.

Figure 37:
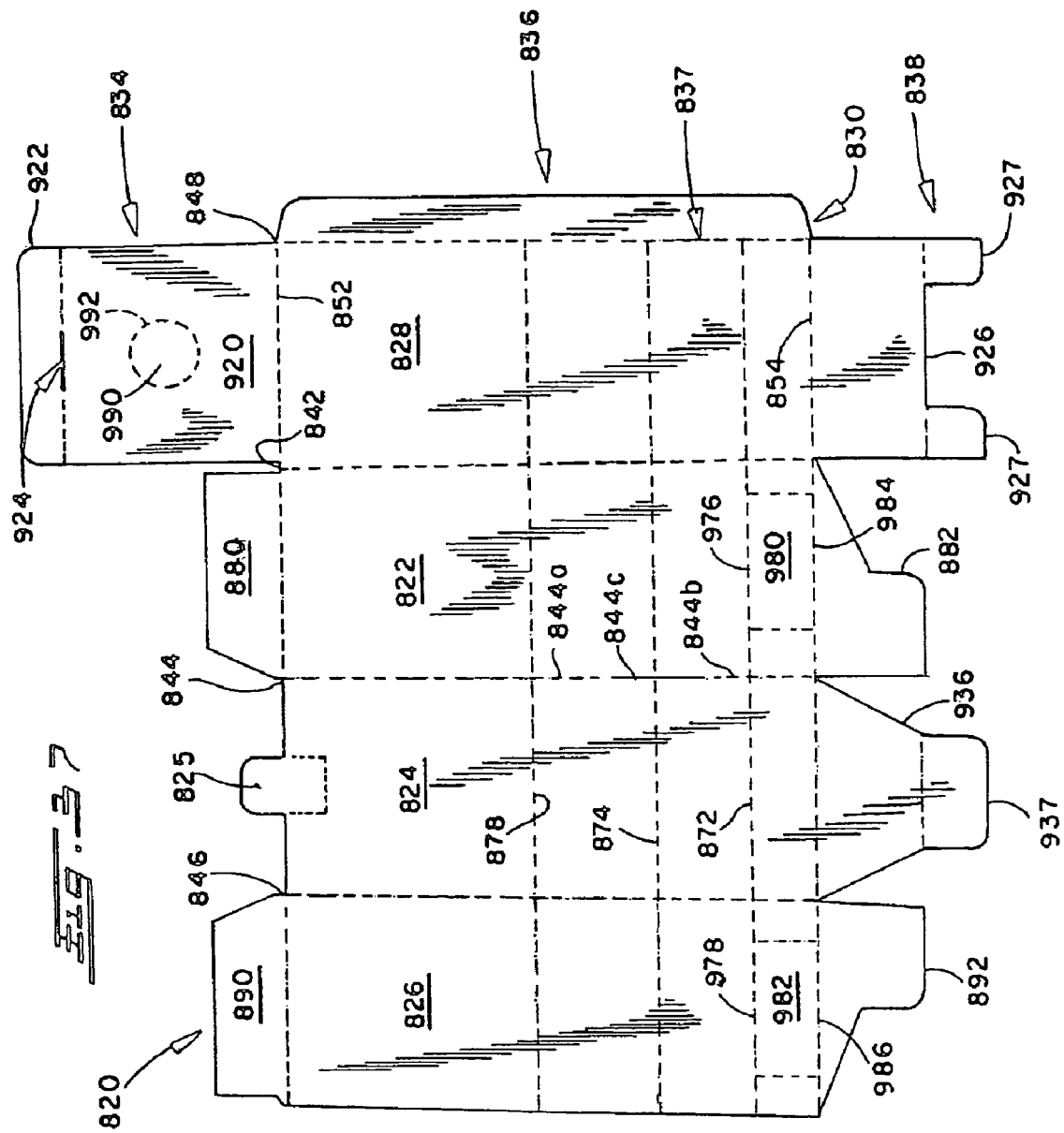
FIG. 37 is a plan view of a paperboard blank used in forming the container of the packaged charcoal product of FIG. 36.
Figure 38:
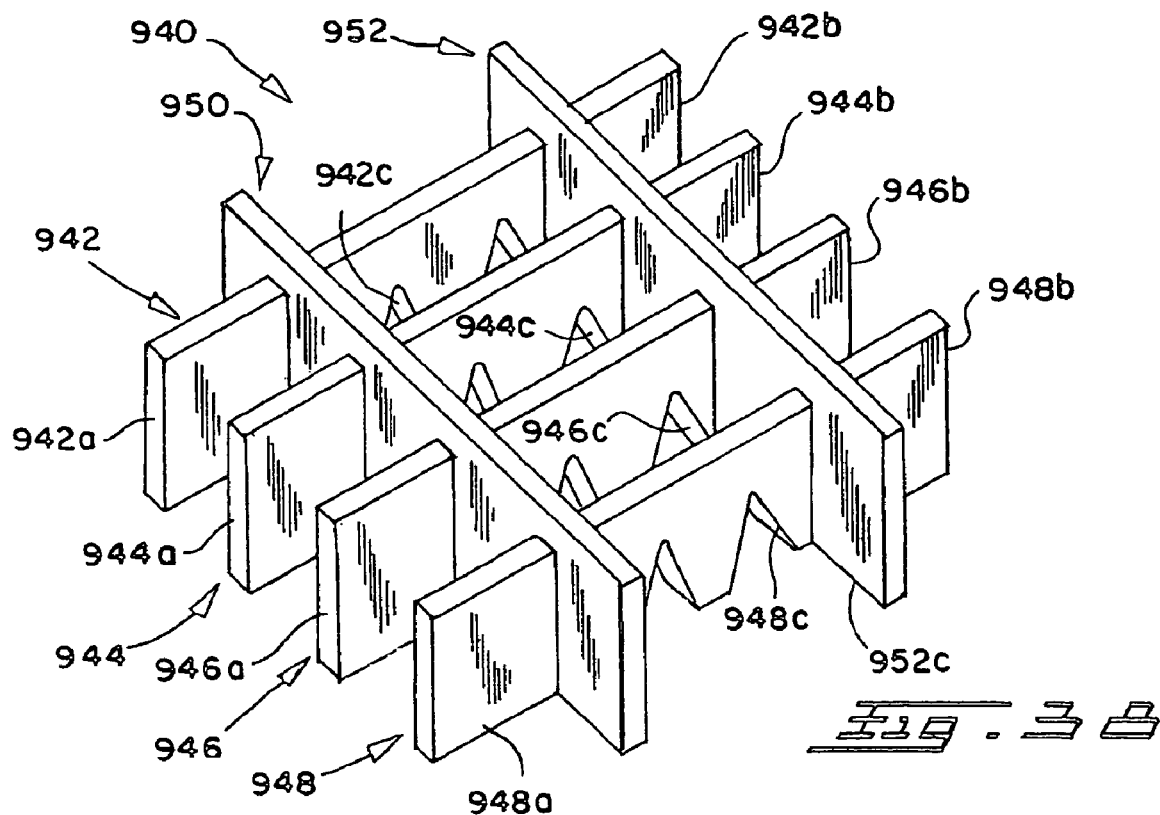
FIG. 38 is a perspective view of an insert for forming interior walls used in the product of FIG. 36.
Figure 39:
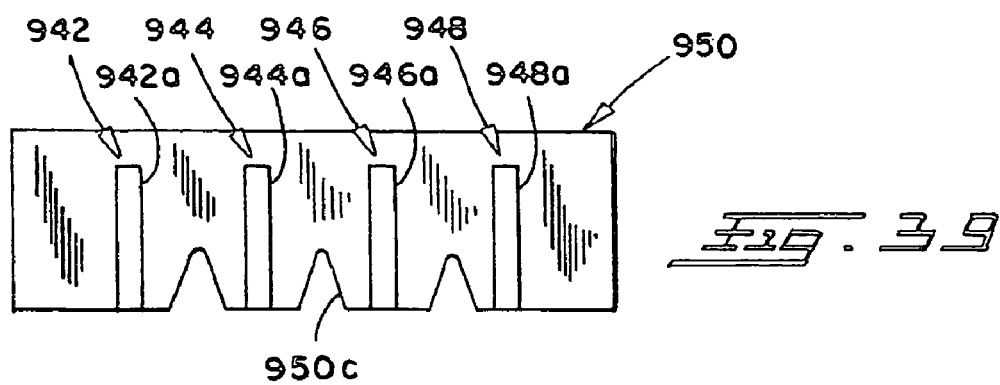
FIG. 39 is a front elevational view of the insert.
Figure 40:
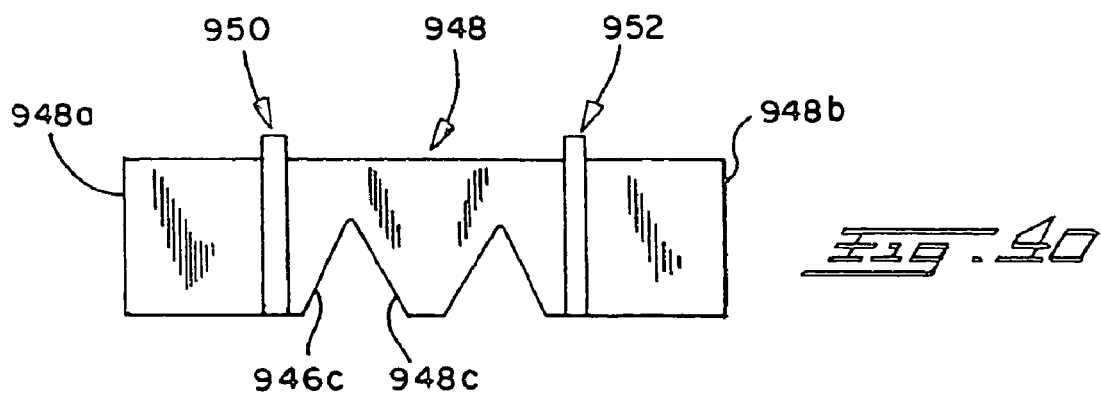
FIG. 40 is a side elevational view of the insert.

Referring now to FIG. 37, the container blank 820 can be fabricated from stiff paperboard or the like, and can be printed upon with product instructions. The container blank 820 is scored or creased vertically to divide the blank into a first side region 822, a second side region 824, a third side region 826, a fourth side region 828, and an overlap region 830. The creases separating the four side regions are straight, vertical and extend for the entire height of the blank 820 and will ultimately form the first corner 842, second corner 844, third corner 846 and fourth corner 848 of the container. The blank 820 is also scored or creased horizontally to create a top region 834, a side wall region 836 and a bottom region 838. A top crease 852 extends horizontally across the entire width of the blank 820 and separates the top region 834 and the side wall region 836. A bottom crease 854 extends horizontally across the entire width of the container blank 820 and separates the side wall region 836 and the bottom region 838.

A lower score line or crease 872 extends horizontally across the entire blank 820 near the bottom of the side wall region 836. An intermediate score line or crease 874 extends horizontally across the blank and is spaced above the lower crease 872. An upper score line or crease 878 is spaced above the intermediate crease 874 and parallel to it. All three crease lines are in a lower portion 837 of the side wall region 836.

The intersection of the various horizontal and vertical regions described above create a number of subregions. The first side region 822 and the third side region 826 intersecting the top region 834 create a first side top region 880 and a third side top region 890. The first and third side top regions 880, 890 are approximately twice as wide as they are high. The fourth side region 828 intersecting the top region 834 creates a fourth side top region 920. The fourth side top region 920 can include an overlap flap 922 with a slot 924 therebetween. The second side region 824 intersecting the top region 834 creates a hinged tab 825. The tab 825 is adapted for insertion into slot 924 when product 800 is in the assembled position.

The first side region 822 and the third side region 826 intersecting the bottom region 838 create a first side bottom region 882 and a third side bottom region 892. The first and third side bottom regions 882, 892 can be engaged with one another when container 820 is folded and assembled. The fourth side region 828 and the second side region 824 intersecting the bottom region 838 create a fourth side bottom region 926 and a second side bottom region 936. The fourth side and second side bottom regions 926, 936 include overlap flaps 927, 937 which can be engaged with one another when container 820 is folded and assembled.

The four corners 842, 844, 846 and 848 are significantly weakened between the lower crease 872 and the upper crease 878. In one embodiment, a portion of the four corners 842, 844, 846, 848 can be perforated for a length, see for example 844a, 844b and 846a, 846b, and slit completely through another length 844c, 846c therebetween. This provides four parallel openings 932 in the lower portion 837 of the side wall region 836 along the four corners 842, 844, 846, 848.

All of the scores, creases, slits and apertures described above are easily created in a die cutting operation on a web press which may also apply printing to one or both sides of the blank 820.

The container blank 820 is folded along the four corners 842, 844, 846, 848 and the overlap region 830 can be fixed to the third side region 826 by adhesive or similar means. One of the bottom region 838 or the top region 834 is then closed. If the bottom is selected for closure, the bottom region 838 is folded such that the first side bottom region 882 and the third side bottom region 892 fold inwardly around the bottom crease 854 and the second side bottom region 936 and the fourth side bottom region 926 are drawn together. The folded portions of the bottom regions lie against one another and the bottom is flat.

Figure 43:
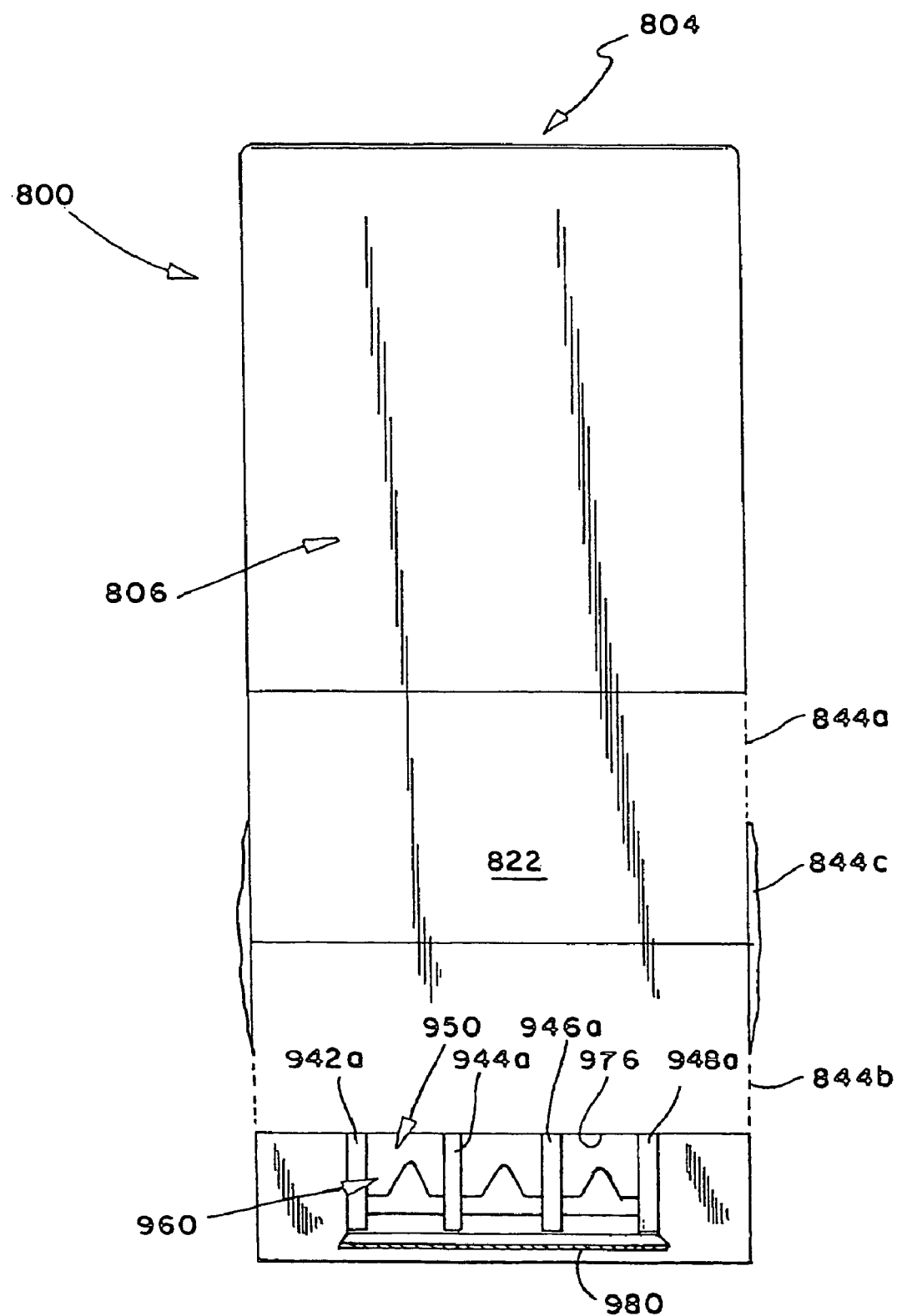
FIG. 43 is a front elevational view of the packaged charcoal product partially opened in preparation for use by the consumer.
Figure 44:
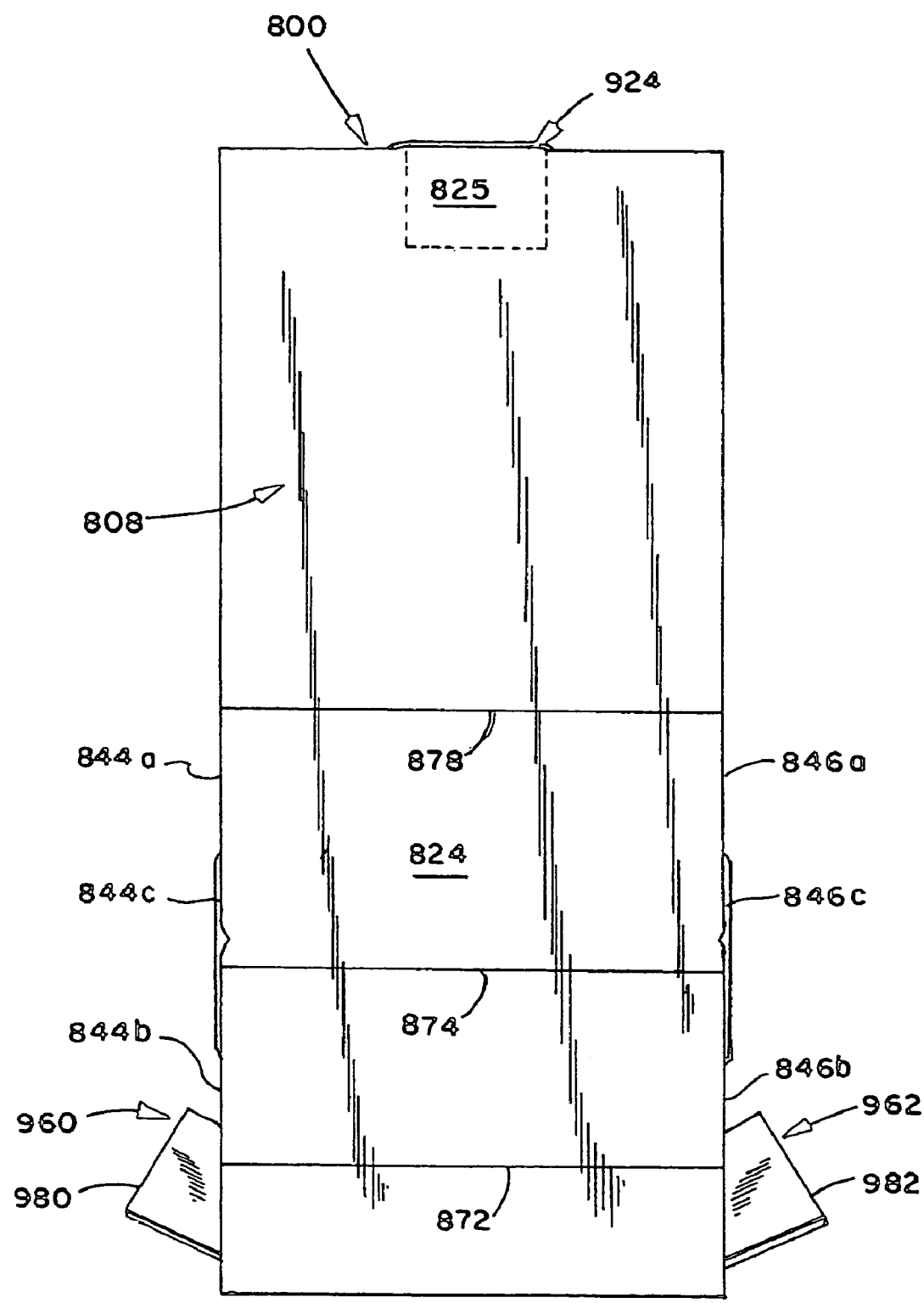
FIG. 44 is a side elevational view of the packaged charcoal product partially opened in preparation for use by the consumer.

FIGS. 38-41 show the insert 940 disposed within container 820 which can be used to promote ignition and to accelerate combustion by elevating the charcoal briquets 780 off of the bottom of the container thereby allowing air circulation within, and through, container 820. The insert 940 can include divider walls comprising six generally rectangular dividers of corrugated cardboard 942, 944, 946, 948, 950, 952, assembled in a grid configuration. Additionally, selected ends 942a, 942b, 944a, 944b, 946a, 946b, 948a, 948b of the dividers 942, 944, 946, 948 can be coated with paraffin. In the assembled orientation, four of the six dividers 942, 944, 946, 948 can be aligned between opposing bottom side slots 960, 962 thereby enabling air to circulate through the bottom of the container (FIGS. 43 and 44). The four dividers of cardboard 942, 944, 946, 948 can be joined by dividers 950, 952 extending transverse thereto, thereby forming the grid pattern. The dividers 942-952 can have a sawtooth arrangement along at least a portion of their respective bottom edges 942c, 944c, 946c, 948c, 950c, 952c. The sawtooth configuration also facilitates air circulation through and around the bottom of the container. It is to be appreciated that dividers 942-952 can be vertically cut through a portion of their height and interengaged with the other dividers. The insert 940 is received and retained within the container 820 and rests at its bottom. The paraffin coated ends 942a, 942b, 944a, 944b, 946a, 946b, 948a, 948b of the selected dividers 942, 944, 946, 948 will be adjacent the vents or slots 960, 962 in side walls 822, 826 at the bottom of the container when assembled.

A selected weight of charcoal briquets can be placed into container 820. The charcoal briquets can be of the type described above and shown in FIGS. 30-33. The briquets 780 are placed upon insert 940 and the container 820 is filled before it is completely closed. It is to be appreciated that the grid pattern of the insert 940 inhibits the briquets from falling all the way to the bottom of the container. After inclusion of the briquets 780, the top region 834 can be brought together in a manner similar to that described for the bottom region 838. The tab 825 can then be inserted into slot 924 thereby retaining the top region 834 in the closed position. The container 820 can then be wrapped with the outer plastic wrap, i.e. shrink wrap (not shown). The outer wrap retains the container 820 in the orientation shown in FIG. 36 and traps any charcoal dust that passes through container 820. This completed product configuration is box-like, easily stacked and palletized, and is dust tight. The plastic wrap prohibits vertical compression. Thus, the four openings 932 in the four corners 842, 844, 846 and 848 of the container 820 are held closed and sealed by the outer plastic wrap. Thus, an easily shipped, stored and merchandised commercial product is presented.

FIGS. 42-44 show the step of preparing the product 800 for use by the ultimate consumer. After purchasing the product, the consumer takes the packaged charcoal product 800 to the place of intended use, typically a backyard grill or barbeque. The product is placed in the bed of the charcoal grill or similar device and the plastic outer wrap is removed (not shown). The two bottom slots 960, 962 are opened by separating perforated lines 976, 978 and pulling flaps 980, 982 outward away from the container 820. The flaps 980, 982 separate along the perforated lines 976, 978 while a lower edge 984, 986 remains intact.

Figure 45:
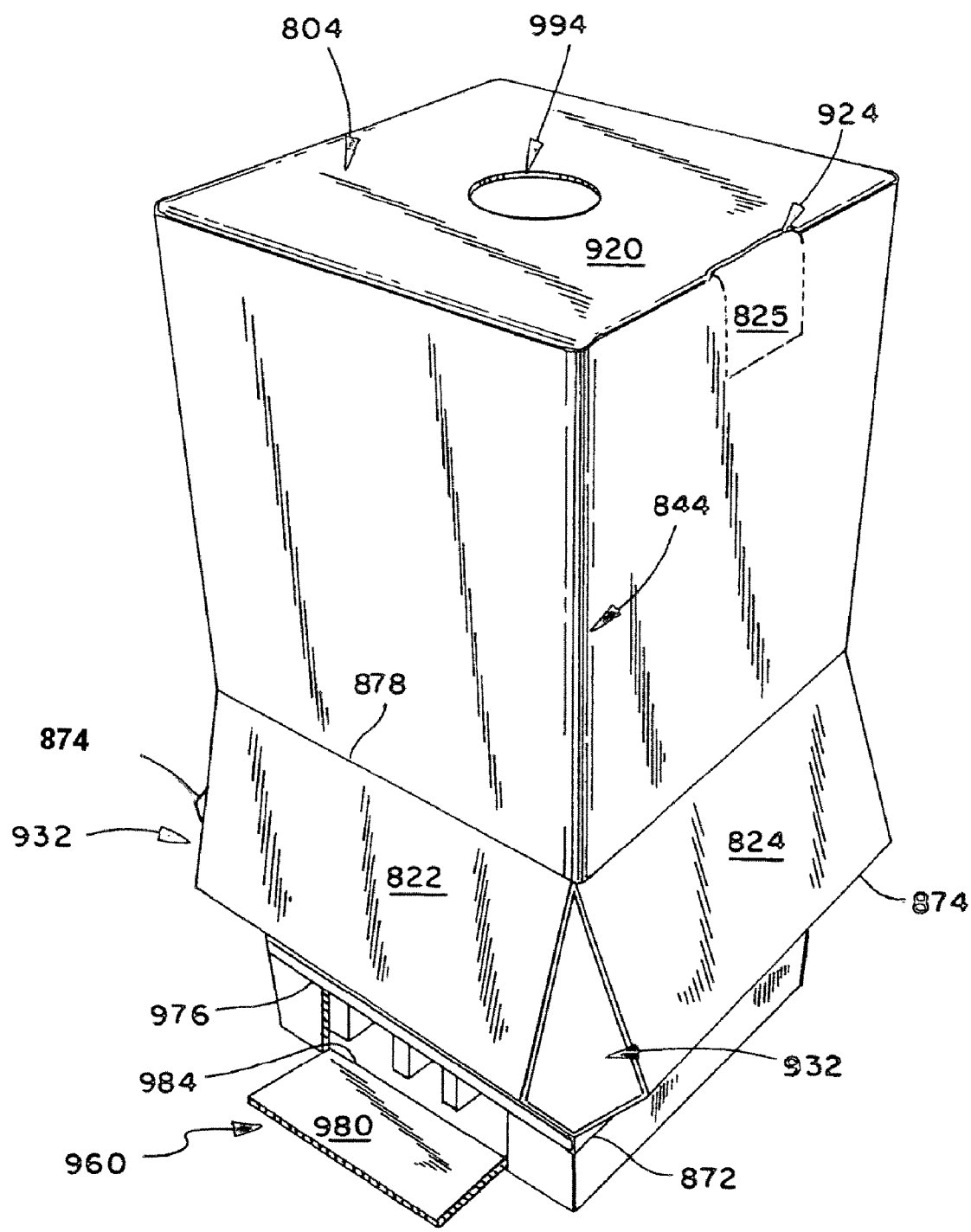
FIG. 45 is a perspective view of the packaged charcoal product of FIGS. 36-44 fully opened just prior to ignition by the consumer.

A circular punch out 990, defined by perforated line 992 in the top of the container, can be pushed inside the container 820 thereby providing an opening or chimney vent 994 through the fourth side top region or wall 920 of the container 820. The container 820 can then be vertically compressed as seen in FIG. 45. The vertical compression causes the four side regions 822, 824, 826, 828 to bulge outwardly between the bottom crease 872 and the top crease 878 thereby expanding the four corner openings 932. The consumer can then use a match, or similar, to ignite one or more of the ends of the dividers 942a, 944a, 946a, 948a, and 942b, 944b, 946b, 948b through the open slots 960, 962.

Importantly, the top half of the container 820 is not split and remains intact as a cap over the center of the pile of charcoal briquets 780. The top half retains heat within the pile of briquets aiding ignition of all the briquets 780. Also, the grooves 786, 788, 796, 798 aid combustion by providing air circulation within the pile of briquets 780 while still allowing close contact between adjacent briquets for the spreading of combustion. Air flow from the open slots 960, 962 and from the expanded four corner openings 932 supports combustion while the vented top 994 prevents the rapid escape of hot products of combustion from the top of the pile of briquets 780. This arrangement aids in the ignition and combustion of the briquets 780.

It is to be appreciated that the wax coated ends 942a, 942b, 944a, 944b, 946a, 946b, 948a, 948b of the selected divider walls not only provide fuel for promoting initial ignition at opposing sides of the container, but also encourage spreading of a flame throughout the bottom portion of the container. As the charcoal briquets 780 are ignited, the container 820 burns away and the consumer is left with an ignited body of briquets appropriate for cooking.

Figure 46:
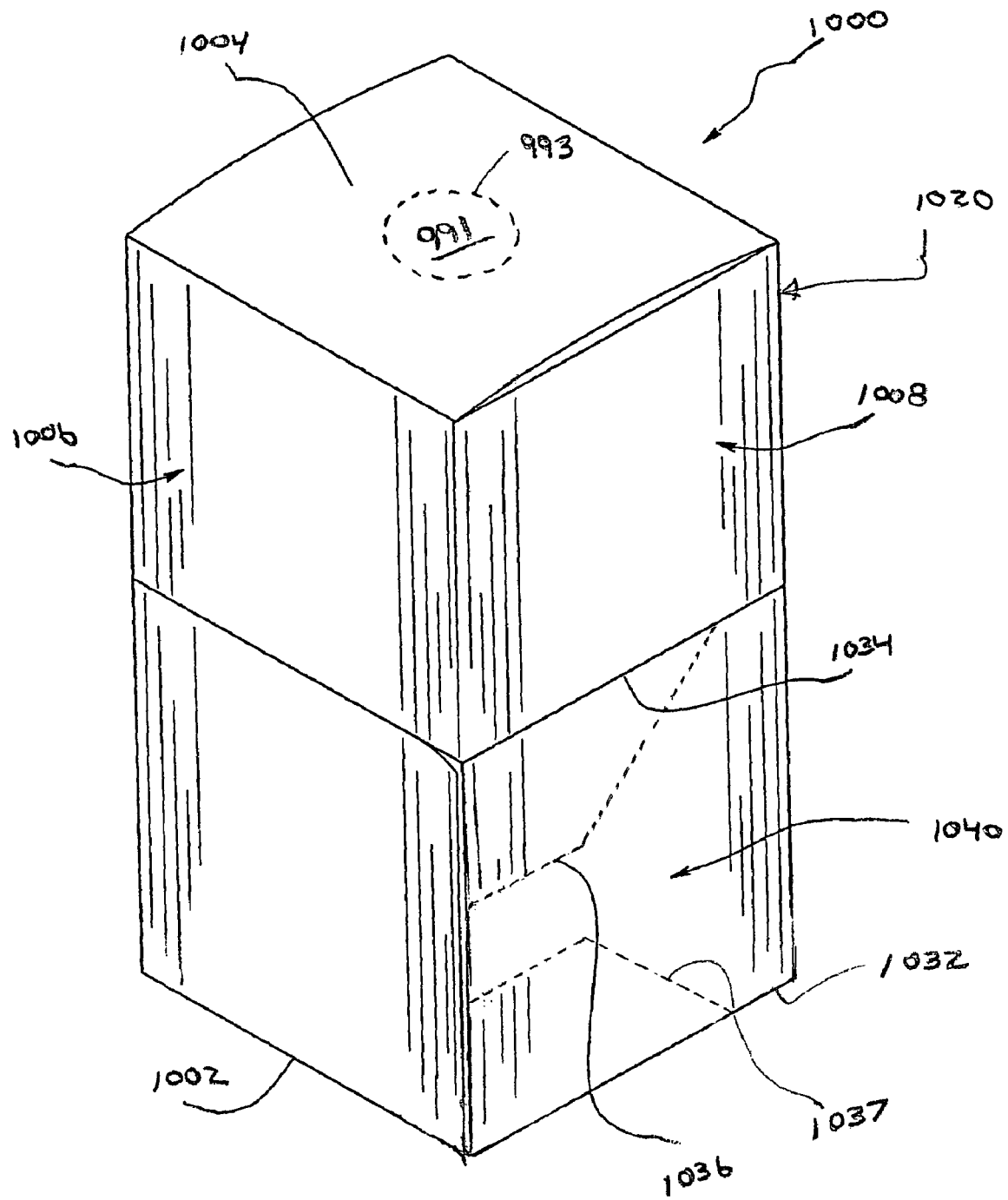
FIG. 46 is a perspective view of still another embodiment of the packaged charcoal product in the complete packaged configuration.
Figure 47:
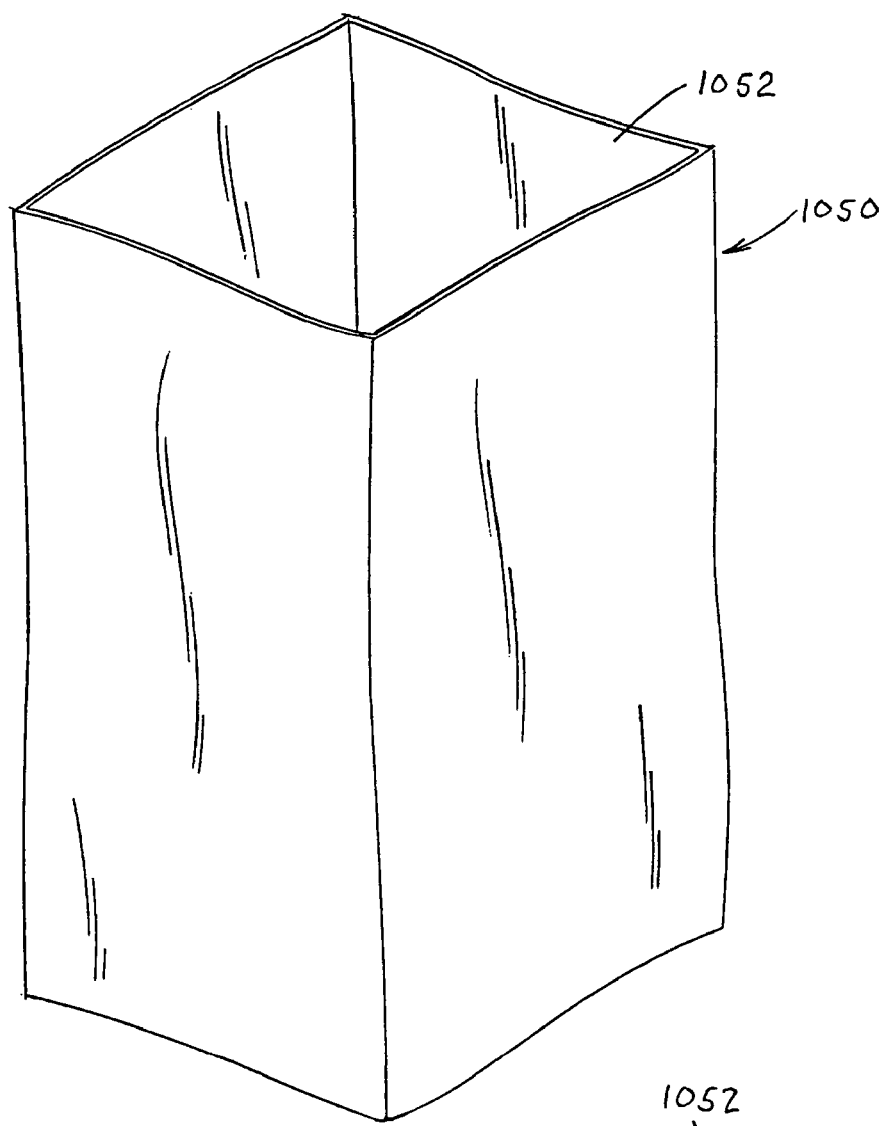
FIG. 47 is a perspective view of an inner bag for surrounding and sealing the charcoal briquets therein; and, FIG. 48 is a top plan view of the inner bag of FIG. 47.
Figure 48:
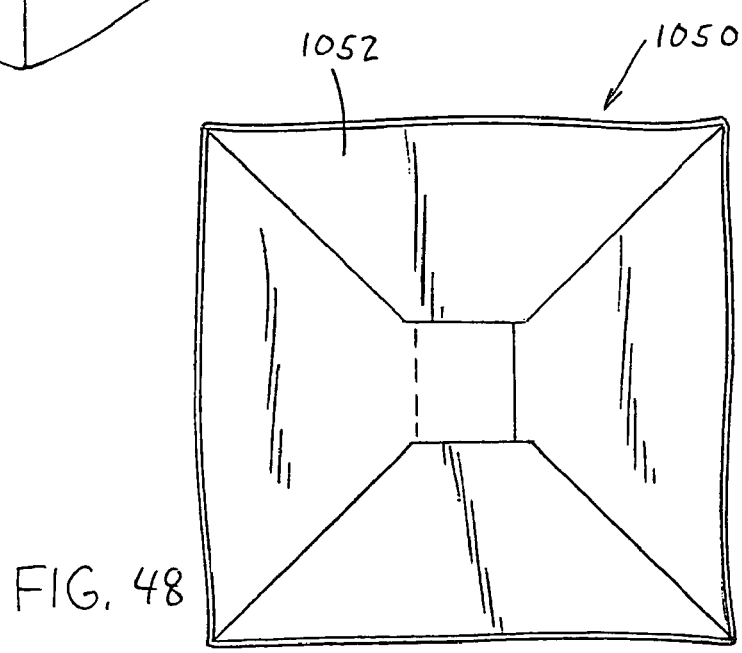

Yet another embodiment of the invention is illustrated in FIGS. 46-48. FIG. 46 illustrates a packaged charcoal product 1000. The product 1000 is shaped like a conventional box in that it has a flat bottom 1002 a flat top 1004 and four flat side walls (only two of which are visible) 1006, 1008. While all of the top, bottom and side walls are generally flat, flaps, creases and joints which vary from absolute flatness do exist in most of these surfaces. Thus, the packaged charcoal product 1000 is generally a rectangular box which is easily stacked, palletized, and displayed on conventional retail shelves and the like. Moreover, the package has large flat surfaces available for merchandising information such as product directions, identifying trademarks and universal product codes. Thus, the product is easy to ship and merchandise and easy for the consumer to handle.

It is to be appreciated that the product of FIG. 46 can be comprised of several elements. These elements can include the inner container 820 (FIG. 36), an outer wrap 1020 fabricated from a blank for encapsulating container 820, an inner bag or liner 1050 (to be described hereinafter), and a number of charcoal briquets illustrated, for example, in FIGS. 30-33. The outer wrap 1020 completely encapsulates inner container 820 in the assembled product 1000 (FIG. 46).

FIGS. 47-48 show the inner bag 1050 which can be disposed within container 820 and used to promote ignition, accelerate combustion, and seal charcoal dust from escaping through container 820 and outer wrap 1020. The inner bag 1050 can comprise rice paper or similar combustible material which promotes ignition. In the assembled orientation, the bag 1050 can be sealed or rolled at its top opening 1052 after the briquets are placed therein (not illustrated). The inner bag 1050 can be received and retained within the container 820 and rests at its bottom. The combustible paper will be adjacent the vents or slots 960, 962 in side walls 822, 826 at the bottom of the container when assembled.

A selected weight of charcoal briquets can be placed in the inner bag 1050. The briquets 780 are placed into bag 1050 and then the bag can be sealed, rolled, or folded and in turn placed into container 820 before the container is completely closed. After inclusion of bag 1050 and briquets 780, the top region 834 can be brought together in a manner similar to that described for the bottom region 838. The tab 825 can then be inserted into slot 924 thereby retaining the top region 834 in the closed position. The container 820 can then be wrapped with the outer wrap 1020. The outer wrap 1020 retains the container 820 in the orientation shown in FIG. 36. This completed product configuration is box-like, easily stacked and palletized, and is dust tight. The outer wrap 1020 prohibits vertical compression. Thus, the four openings 932 in the four corners 842, 844, 846 and 848 of the container 820 are held closed by the outer wrap 1020. Thus, an easily shipped, stored and merchandised commercial product is presented.

FIG. 46 shows outer wrap 1020 which can be created from sheet stocks such as paper board and is generally rectangular. Similar to above, the vertical creases form a first corner, a second corner, a third corner, and a fourth corner when the outer wrap blank is wrapped about the inner container 820 to form the outer wrap 1020. The outer wrap blank can be provided with a bottom perforation line 1032 and a top perforation line 1034. A perforated section including lines 1036, 1037 extend between the bottom perforation line 1032 and the top perforation line 1034. It is to be appreciated that horizontal score lines 1032, 1034 and section score lines 1036, 1037 define a selectively removable band or band portion 1040. Removal of band portion 1040 provides access to the bottom portion of inner container 820.

The outer wrap 1020 can include a circular punch out 991 aligned with the punch out 990. The punch out 991 can be defined by perforated line 993 in the top of the outer wrap 1020. Circular punch outs 990, 991, can be pushed simultaneously inside the container 820 thereby providing an opening or chimney vent 994 through the fourth side top region or wall 920 of the container 820 and the top wall 1004 of the outer wrap 1020.

Importantly, the top halves of the containers 820 and 1020 are not split and remain intact as a cap over the center of the pile of charcoal briquets 780. The top halves retain heat within the pile of briquets aiding ignition of all the briquets 780. Also, the grooves 786, 788, 796, 798 aid combustion by providing air circulation within the pile of briquets 780 while still allowing close contact between adjacent briquets for the spreading of combustion. Air flow from the open slots 960, 962 and from the expanded four corner openings 932 supports combustion while the vented top 994 prevents the rapid escape of hot products of combustion from the top of the pile of briquets 780. This arrangement aids in the ignition and combustion of the briquets 780.

Similar to above, the product 1000 can be prepared for use by the ultimate consumer. After purchasing the product, the consumer takes the packaged charcoal product 1000 to the place of intended use, typically a backyard grill or barbeque. The product is placed in the bed of the charcoal grill or similar device and portion 1040 of outer wrap 1020 is removed (not shown). The two bottom slots 960, 962 are opened by separating perforated lines 976, 978 and pulling flaps 980, 982 outward away from the container 820. The flaps 980, 982 separate along the perforated lines 976, 978 while a lower edge 984, 986 remains intact. The container 820 can then be vertically compressed as seen in FIG. 45. The vertical compression causes the four side regions 822, 824, 826, 828 to bulge outwardly between the bottom crease 872 and the top crease 878 thereby expanding the four corner openings 932. The consumer can then use a match, or similar, to ignite the inner bag 1050 through the open slots 960, 962 or corner openings 932 (not illustrated).

It is to be appreciated that the material of the inner bag 1050 not only seals the charcoal dust inside, but also provides fuel for promoting initial ignition at opposing sides of the container, and also encourages spreading of a flame throughout the bottom portion of the container. As the charcoal briquets 780 are ignited, the inner bag 1050, container 820, outer wrap 1020, and band portion 1040 (selectively retained adjacent thereto) burn away and the consumer is left with an ignited body of briquets appropriate for cooking.

The invention has been described with respect to preferred embodiments. Modifications and alterations of these preferred embodiments will occur to others upon the reading and understanding of the specification. It is our intention to include all such modifications and alterations insofar as they come within the scope of the appended claims or the equivalents.

Having thus described the invention, it is claimed:

1. A packaged charcoal product comprising: a container fabricated from combustible sheet material comprising a bottom wall, a plurality of side walls and a top, said side walls interconnected at creased corners, said creased corners having weakened portions; a bag fabricated from combustible sheet material having a quantity of charcoal briquets contained in said bag; said bag and said charcoal briquets contained in said container; said container including four side regions each having a bottom crease, a top crease, and an intermediate crease therebetween; said side regions adapted to bulge outwardly between said each respective bottom crease and said top crease wherein said corner weakened portions adapted to open when said container is vertically compressed.

2. The packaged charcoal product of claim 1, wherein at least one of said side walls include a slot adapted to be opened prior to ignition.

3. The packaged charcoal product of claim 1, wherein said bag is comprised of rice paper and sealingly closed.

4. The packaged charcoal product of claim 1, wherein said container corners extend above said weakened portions, whereby an upper portion of said container remains intact upon application of vertical compression to said container, said intact container upper portion forming a ventable heat retaining cap over said quantity of charcoal briquets.

5. The packaged charcoal product of claim 1, further comprising a perforated portion in said top region adapted for removal therefrom.

6. The packaged charcoal product of claim 1, wherein said quantity of charcoal briquets comprises a plurality of unattached pillow shaped briquets having grooves in their surfaces.

7. The packaged charcoal product of claim 1, wherein said quantity of charcoal briquets comprises a plurality of unattached briquets having a convex upper surface having an elliptical periphery and a plurality of grooves; and, a convex lower surface having an elliptical periphery identical to the periphery of said upper surface and a plurality of grooves, said upper surface joined to said lower surface at said peripheries.

8. A packaged charcoal product comprising: a first container fabricated from a combustible sheet material and having a quantity of charcoal briquets contained therein; a second container fabricated from a combustible sheet material comprising a rectangular flat bottom wall, four flat side walls interconnected at four right angular corners, said four side walls all being perpendicular to said bottom wall, a ventable flat top generally parallel to said bottom wall, said four corners having weakened portions; said first container contained in said second container; a third container surrounding said second container including a selectively removable wrap portion surrounding said corner weakened portions; and, said weakened corner portions adapted to split open when said wrap portion is removed and said second container is vertically compressed.

9. The packaged charcoal product of claim 8, wherein said first container is a bag comprised of combustible paper and sealingly closed.

10. The packaged charcoal product of claim 8, wherein said side walls have horizontal scored lines allowing said side walls to bulge outwardly in a controlled manner when said container is vertically compressed.

11. The packaged charcoal product of claim 8, wherein said weakened portions of said second container corners include vertical slits.

12. The packaged charcoal product of claim 8, wherein said second container corners extend above said weakened portions, whereby an upper portion of said second container remains intact upon application of vertical compression to said second container, said upper portion forming a heat retaining cap over said quantity of charcoal.

13. The packaged charcoal product of claim 8, further comprising a perforated portion in at least one of said side walls adapted to be pulled away from said container.

14. The packaged charcoal product of claim 8, wherein said quantity of charcoal briquets comprises a plurality of unattached pillow shaped briquets having grooves in their surfaces.

15. The packaged charcoal product of claim 8, wherein said quantity of charcoal briquets comprises a plurality of unattached briquets having a convex upper surface having an elliptical periphery and a plurality of grooves; and, a convex lower surface having an elliptical periphery identical to the periphery of said upper surface and a plurality of grooves, said upper surface joined to said lower surface at said peripheries.

16. A packaged charcoal product comprising: a first container fabricated from a combustible sheet material and having a quantity of charcoal briquets contained therein; a second container fabricated from combustible sheet material comprising a continuous bottom wall, a plurality of side walls interconnected at creased corners, said creased corners having weakened portions; a third container surrounding at least a portion of said second container including a selectively removable wrap portion surrounding said corner weakened portions; and, said weakened corner portions adapted to spit open when said wrap portion is removed and said second container is vertically compressed.

17. The packaged charcoal product of claim 16, wherein said third container is combustible sheet material.

18. The packaged charcoal product of claim 16, wherein said second container has four substantially planar side walls.

19. The packaged charcoal product of claim 16, wherein said first container is a bag comprised of combustible paper and sealingly closed.

20. The packaged charcoal product of claim 16, wherein said side walls have horizontal scored lines allowing said side walls to bulge outwardly in a controlled manner when said container is vertically compressed.

21. The packaged charcoal product of claim 16, wherein at least one of said side walls includes a perforated portion, said perforated portion comprising a first slot adapted for opening.

22. The packaged charcoal product of claim 21, wherein a second side wall includes a perforated portion, said second side wall perforated portion comprising a second slot adapted for opening.

23. The packaged charcoal product of claim 22, wherein said first slot and said second slot are positioned on opposing sides of said container.

24. The packaged charcoal product of claim 16, further comprising a ventable top including a pair of aligned perforated portions, said perforated portions adapted to be pushed into said second container thereby forming a vent in said top of said package.

25. The packaged charcoal product of claim 24, wherein said perforated portions are circular.

26. The packaged charcoal product of claim 16, wherein said quantity of charcoal briquets comprises a plurality of unattached briquets having a convex upper surface having an elliptical periphery and a plurality of grooves; and, a convex lower surface having an elliptical periphery identical to the periphery of said upper surface and a plurality of grooves, said upper surface joined to said lower surface at said peripheries.

* * * * *